United States Patent
Kim et al.

(10) Patent No.: US 9,661,516 B2
(45) Date of Patent: May 23, 2017

(54) METHOD AND APPARATUS FOR PERFORMING MEASUREMENT IN WIRELESS COMMUNICATION SYSTEM

(71) Applicant: LG ELECTRONICS INC., Seoul (KR)

(72) Inventors: Eunsun Kim, Anyang-si (KR);
Sukhyon Yoon, Anyang-si (KR);
Hanbyul Seo, Anyang-si (KR);
Byounghoon Kim, Anyang-si (KR);
Kijun Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/383,457

(22) PCT Filed: Mar. 18, 2013

(86) PCT No.: PCT/KR2013/002185
§ 371 (c)(1),
(2) Date: Sep. 5, 2014

(87) PCT Pub. No.: WO2013/141544
PCT Pub. Date: Sep. 26, 2013

(65) Prior Publication Data
US 2015/0043369 A1 Feb. 12, 2015

Related U.S. Application Data

(60) Provisional application No. 61/612,388, filed on Mar. 18, 2012, provisional application No. 61/646,232, filed on May 11, 2012.

(51) Int. Cl.
H04W 24/08 (2009.01)
H04J 11/00 (2006.01)
H04W 52/34 (2009.01)

(52) U.S. Cl.
CPC .......... *H04W 24/08* (2013.01); *H04J 11/005* (2013.01); *H04W 52/34* (2013.01)

(58) Field of Classification Search
None
See application file for complete search history.

(56) References Cited

U.S. PATENT DOCUMENTS

2010/0113008 A1   5/2010  Wang et al.
2010/0322227 A1 * 12/2010  Luo .................. H04B 7/024
                                           370/345

(Continued)

FOREIGN PATENT DOCUMENTS

KR   WO 2012050391 A1 *  4/2012  ........... H04W 4/005
WO   WO 2011/130444 A1   10/2011
WO   WO 2012/019362 A1    2/2012

*Primary Examiner* — Hassan Kizou
*Assistant Examiner* — Deepa Belur
(74) *Attorney, Agent, or Firm* — Birch, Stewart, Kolasch & Birch, LLP

(57) ABSTRACT

A method and apparatus for performing measurement are disclosed. The method for performing radio link monitoring by a user equipment (UE) in a wireless communication system includes: performing cancellation of a reference signal (RS) of a neighbor cell; and determining whether to declare a radio link failure (RLF) on the basis of a reference signal (RS) of a serving cell by using information of a predetermined power ratio related to the neighbor cell.

9 Claims, 15 Drawing Sheets

(56) References Cited

U.S. PATENT DOCUMENTS

| | | | |
|---|---|---|---|
| 2011/0256861 A1 | 10/2011 | Yoo et al. | |
| 2012/0113844 A1* | 5/2012 | Krishnamurthy | H04L 1/0026 370/252 |
| 2012/0122472 A1* | 5/2012 | Krishnamurthy | H04L 5/0053 455/456.1 |
| 2012/0213108 A1* | 8/2012 | Ji | H04B 7/024 370/252 |
| 2012/0281548 A1* | 11/2012 | Lin | H04W 36/30 370/242 |
| 2012/0307821 A1* | 12/2012 | Kwon | H04L 5/001 370/350 |
| 2013/0003604 A1* | 1/2013 | Blankenship | H04L 5/0053 370/255 |
| 2013/0033998 A1* | 2/2013 | Seo | H04W 24/00 370/252 |
| 2013/0195023 A1* | 8/2013 | Vaisanen | H04L 1/20 370/329 |
| 2014/0112155 A1* | 4/2014 | Lindoff | H04W 24/08 370/242 |

\* cited by examiner

FIG. 5
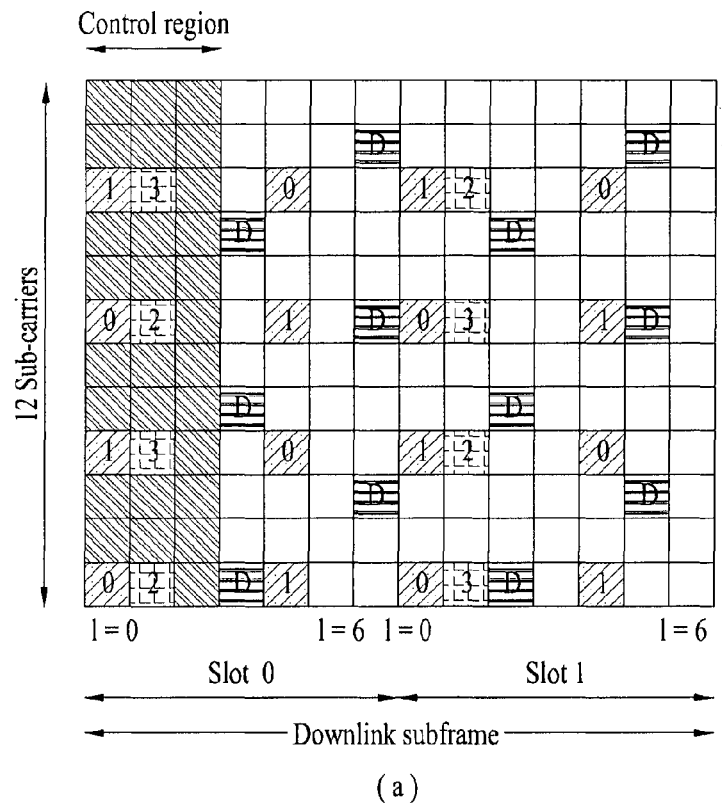
(a)
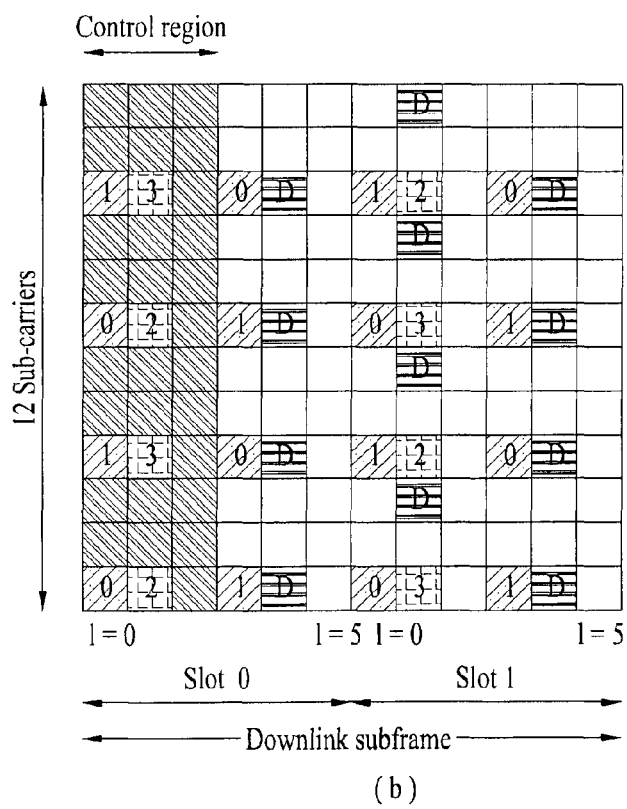
(b)

MeNB : macro eNodeB  
PeNB : pico eNodeB  
FeNB : femto eNodeB

MUE : macro UE  
PUE : pico UE  
FUE : femto eNodeB

Marco-pico (With pathloss-based cell selection)

FIG. 10
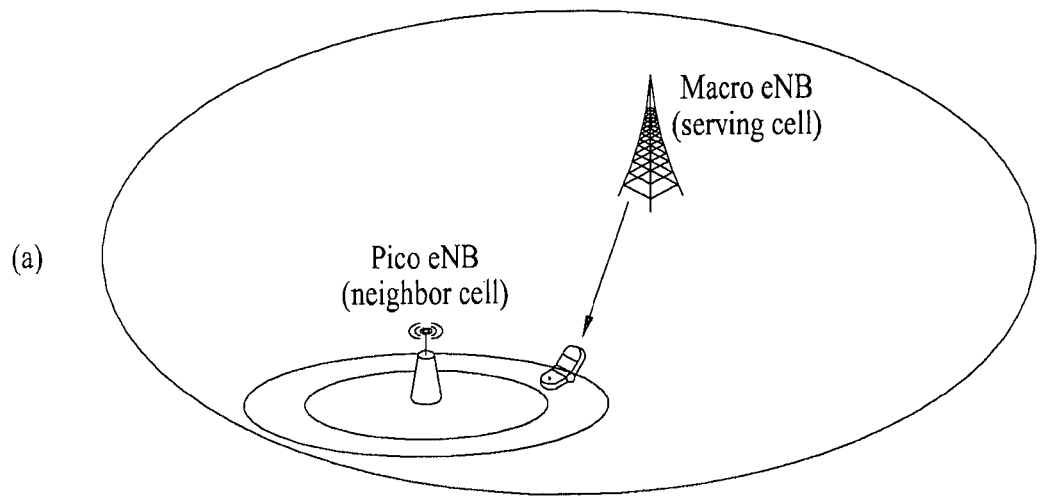
(a)
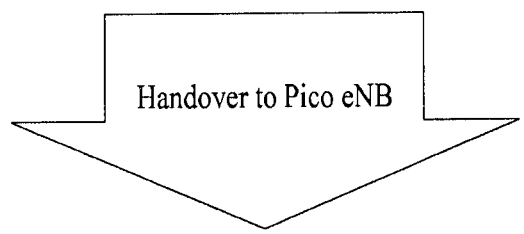
(b)
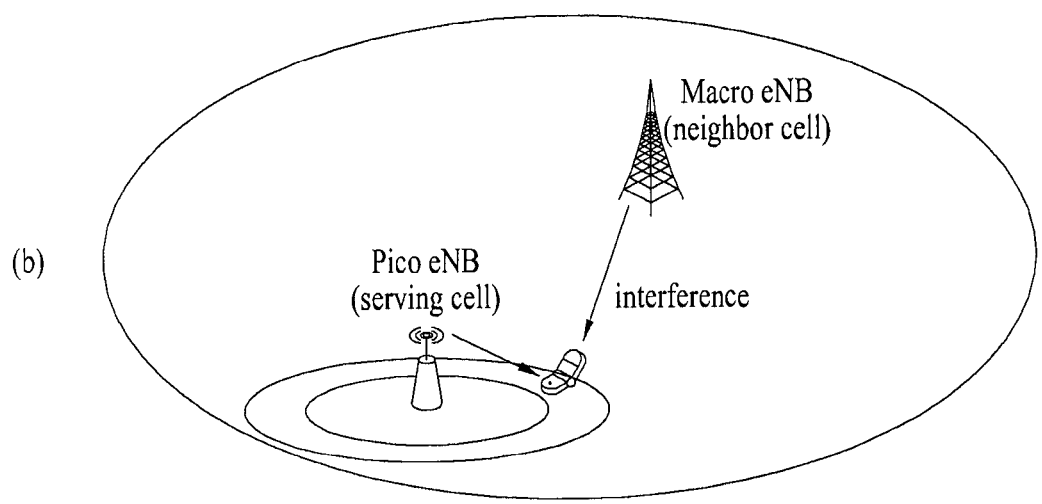

METHOD AND APPARATUS FOR PERFORMING MEASUREMENT IN WIRELESS COMMUNICATION SYSTEM

CROSS REFERENCE TO RELATED APPLICATIONS

This application is the National Phase of PCT/KR2013/002185 filed on Mar. 18, 2013, which claims priority under 35 U.S.C. 119(e) to U.S. Provisional Application No. 61/612,388 filed on Mar. 18, 2012 and to U.S. Provisional Application No. 61/646,232 filed on May 11, 2012, all of which are hereby expressly incorporated by reference herein in its entirety.

TECHNICAL FIELD

The present invention relates to a wireless communication system, and more particularly to a method and apparatus for performing measurement in a wireless communication system.

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, a Multi-Carrier Frequency Division Multiple Access (MC-FDMA) system, and the like.

DISCLOSURE

Technical Problem

Accordingly, the present invention is directed to a method and apparatus for performing measurement in a wireless communication system that substantially obviates one or more problems due to limitations and disadvantages of the related art.

An object of the present invention is to provide technologies related to radio link monitoring and system information acquisition in a serious interference situation.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

In accordance with a first technical aspect of the present invention, a method for performing radio link monitoring by a user equipment (UE) in a wireless communication system includes: performing cancellation of a reference signal (RS) of a neighbor cell; and determining whether to declare a radio link failure (RLF) on the basis of a reference signal (RS) of a serving cell by using information of a predetermined power ratio related to the neighbor cell.

In accordance with a second technical aspect of the present invention, a method for receiving system information by a user equipment (UE) in a wireless communication system includes performing cancellation of a physical broadcast channel (PBCH) signal of a neighbor cell; and receiving system information through a PBCH of a serving cell by using information of a predetermined power ratio related to the neighbor cell.

The first and second technology aspects may include the following description.

The predetermined power ratio information may be the ratio of a transmission power of a physical downlink control channel (PDCCH) of the neighbor cell to a transmission power of a cell-specific reference signal (RS).

The method may further include: receiving a ratio of a transmission power of a physical downlink control channel (PDCCH) of the neighbor cell to a transmission power of a cell-specific reference signal (RS) from the serving cell.

The ratio of a transmission power of PDCCH of the neighbor cell to a transmission power of cell-specific reference signal (RS) may be transmitted to the UE through higher layer signaling.

The neighbor cell may be a cell used as an interference source when the UE receives a signal from the serving cell.

In accordance with a third technical aspect of the present invention, a user equipment (UE) apparatus for use in a wireless communication system includes: a reception (Rx) module; and a processor, wherein the processor performs cancellation of a reference signal (RS) of a neighbor cell, and determines whether to declare a radio link failure (RLF) on the basis of a reference signal (RS) of a serving cell by using information of a predetermined power ratio related to the neighbor cell.

In accordance with a fourth technical aspect of the present invention, a user equipment (UE) apparatus for use in a wireless communication system includes: a reception (Rx) module; and a processor, wherein the processor performs cancellation of a physical broadcast channel (PBCH) signal of a neighbor cell, and receives system information through a PBCH of a serving cell by using information of a predetermined power ratio related to the neighbor cell The first and second technology aspects may include the following description.

The predetermined power ratio information may be the ratio of a transmission power of a physical broadcast channel (PBCH) of the neighbor cell to a transmission power of a cell-specific reference signal (RS).

The UE may perform channel estimation when receiving the PBCH of the serving cell using the predetermined power ratio information.

The serving cell and the neighbor cell may be identical in terms of at least one of a radio frame and a subframe boundary.

If the UE receives the ratio of a transmission power of a physical downlink control channel (PDCCH) of the neighbor cell to a transmission power of a cell-specific reference signal (RS), the ratio of the PDCCH transmission power to cell-specific RS transmission power may be used for channel estimation during PBCH reception of the serving cell.

The ratio of a transmission power of PDCCH of the neighbor cell to a transmission power of cell-specific reference signal (RS) may be transmitted to the UE through higher layer signaling.

The neighbor cell may be a cell used as an interference source when the UE receives a signal from the serving cell.

Advantageous Effects

As is apparent from the above description, exemplary embodiments of the present invention can stably monitor a radio link and can stably acquire system information even in a serious interference situation.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 5 is a conceptual diagram illustrating a reference signal (RS).

FIG. 10 is a conceptual diagram illustrating summaries of embodiments of the present invention.

BEST MODE

Figure 1:
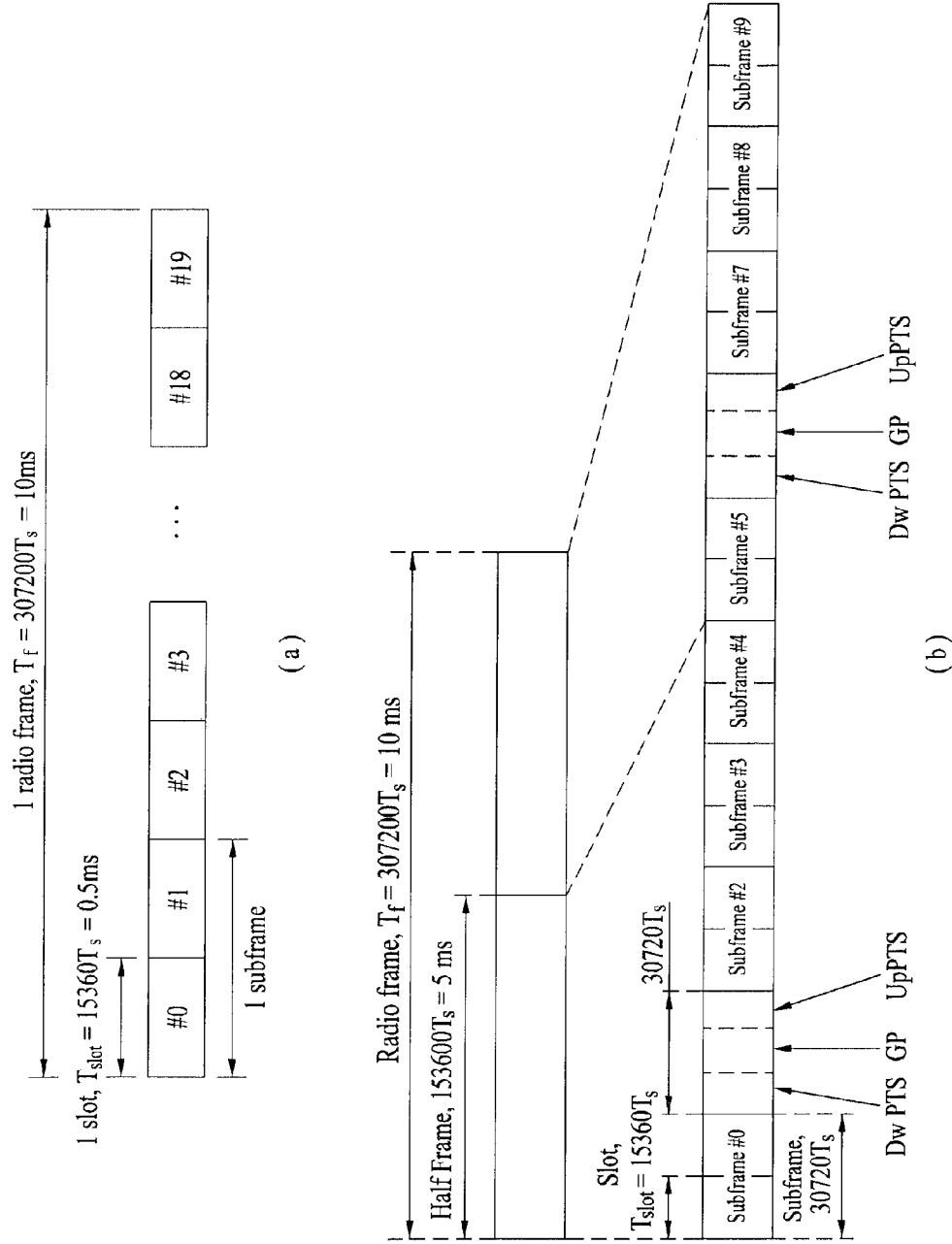
FIG. 1 exemplarily shows a radio frame structure.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with the terms Relay Node (RN) or Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Partnership Project (3GPP) system, a 3GPP Long Term Evolution (LTE) system, an LTE-Advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by IEEE 802.16e (WirelessMAN-OFDMA Reference System) and advanced IEEE 802.16m (WirelessMAN-OFDMA Advanced System). For clarity, the following description focuses on IEEE 802.11 systems. However, technical features of the present invention are not limited thereto.

LTE/LTE-A Resource Structure/Channel

FIG. 1 exemplarily shows a radio frame structure.

The structure of a radio frame in 3GPP LTE system will be described with reference to FIG. 1. In a cellular Orthogonal Frequency Division Multiplexing (OFDM) radio packet communication system, uplink/downlink data packet transmission is performed in subframe units. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time Division Duplex (TDD).

FIG. 1(a) is a diagram showing the structure of the type 1 radio frame. A radio frame includes 10 subframes, and one subframe includes two slots in the time domain. A time required for transmitting one subframe is defined in a Transmission Time Interval (TTI). For example, one subframe may have a length of 1 ms and one slot may have a length of 0.5 ms. One slot may include a plurality of OFDM symbols in time domain and include a plurality of Resource Blocks (RBs) in frequency domain. Since the 3GPP LTE system uses OFDMA in downlink, the OFDM symbol indicates one symbol duration. The OFDM symbol may be called an SC-FDMA symbol or a symbol duration. An RB is a resource allocation unit and includes a plurality of contiguous subcarriers in one slot.

The number of OFDM symbols included in one slot may be changed according to the configuration of a Cyclic Prefix (CP). The CP includes an extended CP and a normal CP. For example, if the OFDM symbols are configured by the normal CP, the number of OFDM symbols included in one slot may be seven. If the OFDM symbols are configured by the extended CP, the length of one OFDM symbol is increased, the number of OFDM symbols included in one slot is less than that of the case of the normal CP. In case of the extended CP, for example, the number of OFDM symbols included in one slot may be six. If a channel state is unstable, for example, if a User Equipment (UE) moves at a high speed, the extended CP may be used in order to further reduce interference between symbols.

In case of using the normal CP, since one slot includes seven OFDM symbols, one subframe includes 14 OFDM symbols. At this time, the first two or three OFDM symbols of each subframe may be allocated to a Physical Downlink Control Channel (PDCCH) and the remaining OFDM symbols may be allocated to a Physical Downlink Shared Channel (PDSCH).

The structure of a type 2 radio frame is shown in FIG. 1(b). The type 2 radio frame includes two half-frames, each of which is made up of five subframes, a downlink pilot time slot (DwPTS), a guard period (GP), and an uplink pilot time slot (UpPTS), in which one subframe consists of two slots. That is, one subframe is composed of two slots irrespective of the radio frame type. DwPTS is used to perform initial cell search, synchronization, or channel estimation. UpPTS is used to perform channel estimation of a base station and uplink transmission synchronization of a user equipment (UE). The guard interval (GP) is located between an uplink and a downlink so as to remove interference generated in the uplink due to multi-path delay of a downlink signal. That is, one subframe is composed of two slots irrespective of the radio frame type.

The structure of the radio frame is only exemplary. Accordingly, the number of subframes included in the radio frame, the number of slots included in the subframe or the number of symbols included in the slot may be changed in various manners.

Figure 2:
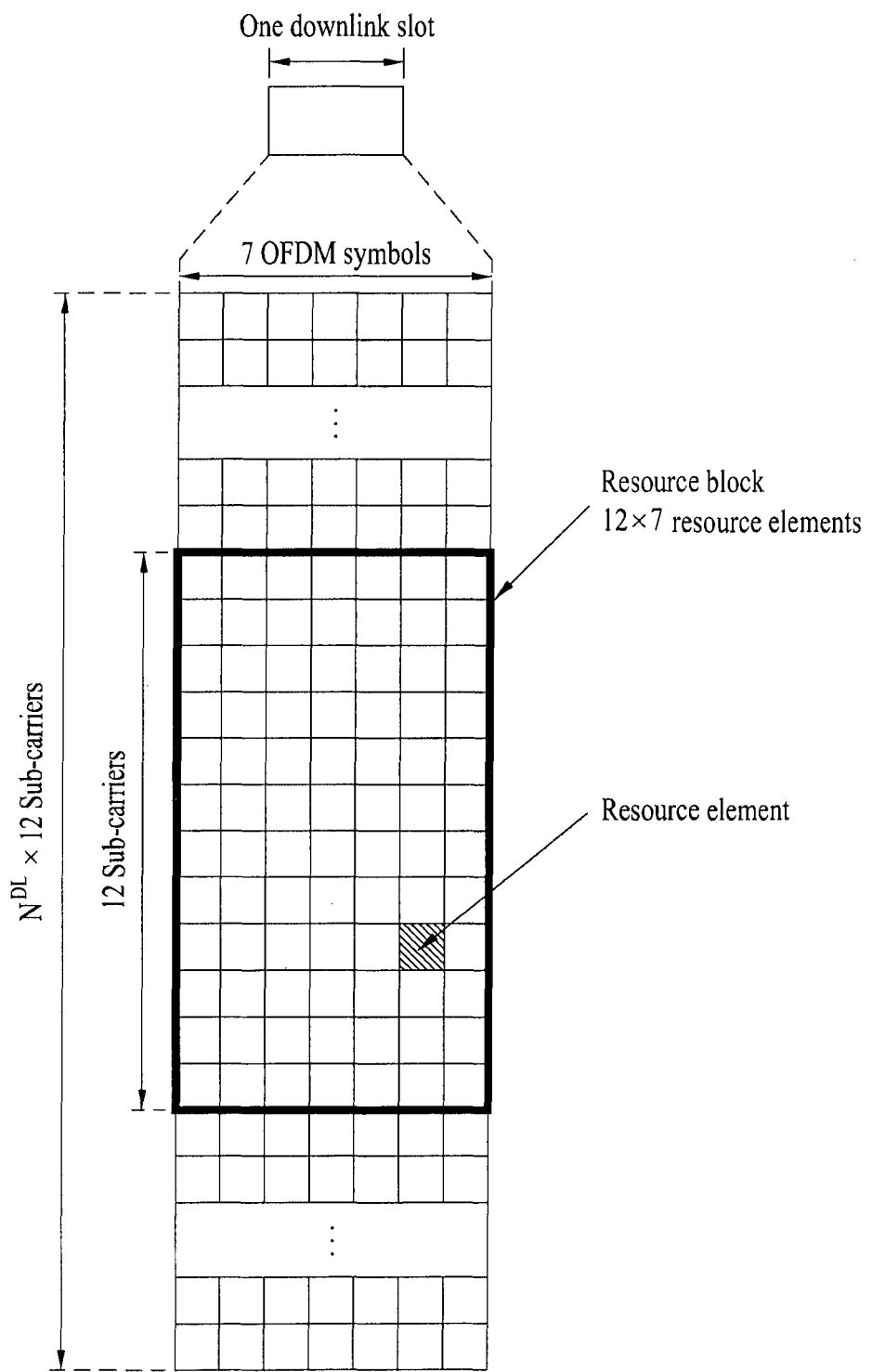
FIG. 2 exemplarily shows a resource grid of a downlink slot.

FIG. 2 is a diagram showing a resource grid in a downlink slot. Although one downlink slot includes seven OFDM symbols in a time domain and one RB includes 12 subcarriers in a frequency domain in the figure, the scope or spirit of the present invention is not limited thereto. For example, in case of a normal Cyclic Prefix (CP), one slot includes 7 OFDM symbols. However, in case of an extended CP, one slot may include 6 OFDM symbols. Each element on the resource grid is referred to as a resource element. One RB includes 12×7 resource elements. The number $N^{DL}$ of RBs included in the downlink slot is determined based on downlink transmission bandwidth. The structure of the uplink slot may be equal to the structure of the downlink slot.

Figure 3:
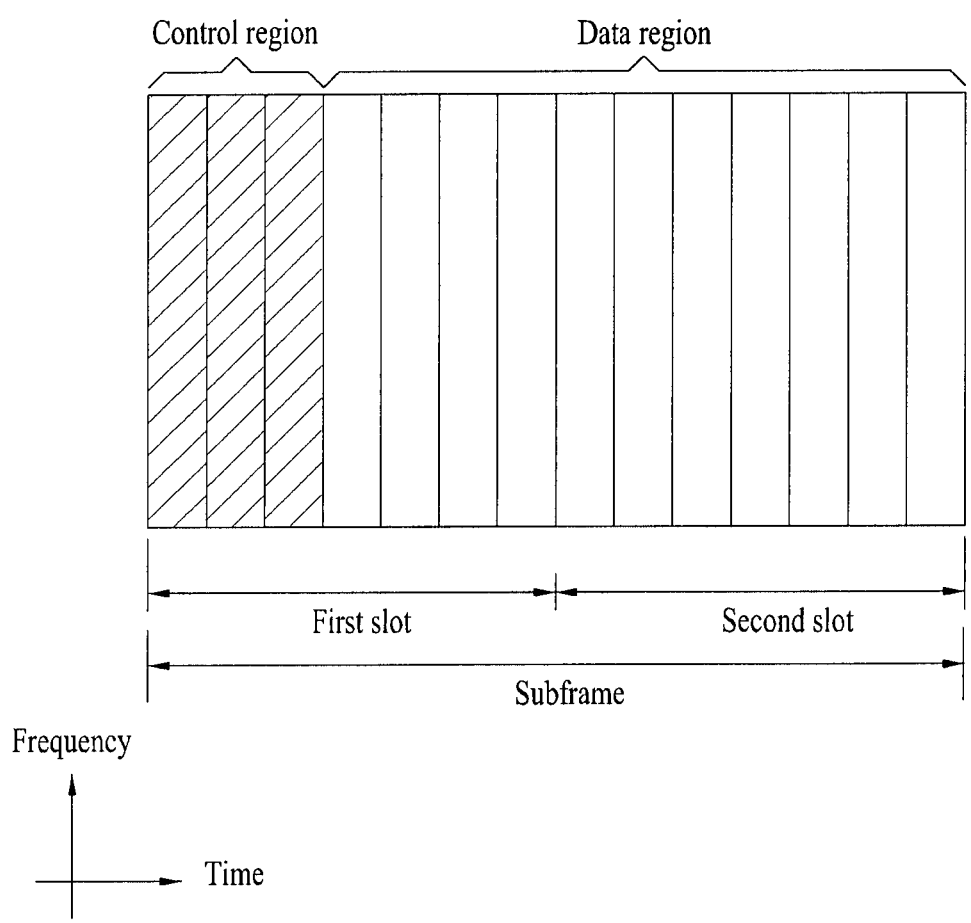
FIG. 3 exemplarily shows a downlink subframe structure.

FIG. 3 is a diagram showing the structure of a downlink subframe. A maximum of three OFDM symbols of a front portion of a first slot within one subframe corresponds to a control region to which a control channel is allocated. The remaining OFDM symbols correspond to a data region to which a Physical Downlink Shared Channel (PDSCH) is allocated. The basic unit of transmission becomes one subframe. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and includes information about the number of OFDM symbols used to transmit the control channel in the subframe. The PHICH includes a HARQ ACK/NACK signal as a response to uplink transmission. The control information transmitted through the PDCCH is referred to as Downlink Control Information (DCI). The DCI includes uplink or downlink scheduling information or an uplink transmit power control command for a certain UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of a higher layer control message such as a Random Access Response (RAR) transmitted on the PDSCH, a set of transmit power control commands for individual UEs in a certain UE group, transmit power control information, activation of Voice over IP (VoIP), etc. A plurality of PDCCHs may be transmitted within the control region. The UE may monitor the plurality of PDCCHs. The PDCCHs are transmitted as an aggregate of one or several contiguous control channel elements (CCEs). The CCE is a logical allocation unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The eNB (or base station) determines a PDCCH format according to a DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier P-RNTI may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 4:
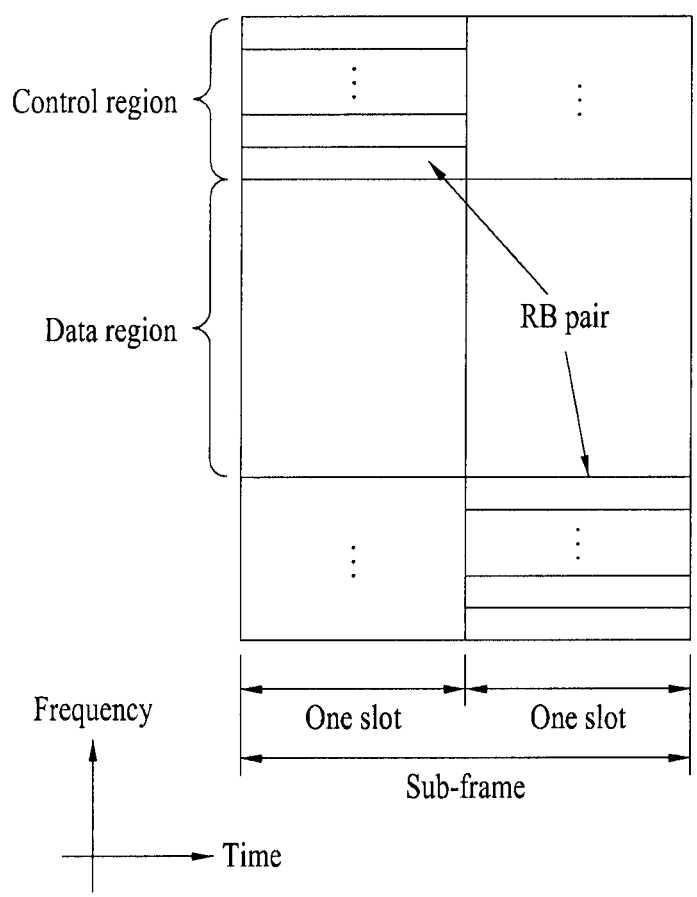
FIG. 4 exemplarily shows an uplink subframe structure.

FIG. 4 is a diagram showing the structure of an uplink frame. The uplink subframe may be divided into a control region and a data region in a frequency domain. A Physical Uplink Control Channel (PUCCH) including uplink control information is allocated to the control region. A Physical Uplink Shared Channel (PUSCH) including user data is allocated to the data region. In order to maintain single carrier characteristics, one UE does not simultaneously transmit the PUCCH and the PUSCH. The PUCCH for one UE is allocated to an RB pair in a subframe. RBs belonging to the RB pair occupy different subcarriers with respect to two slots. Thus, the RB pair allocated to the PUCCH is "frequency-hopped" at a slot edge.

Reference Signal (RS)

In a wireless communication system, since packets are transmitted through a radio channel, a signal may be distorted during transmission. In order to enable a reception side to correctly receive the distorted signal, distortion of the received signal should be corrected using channel information. In order to detect the channel information, a method of transmitting a signal, of which both the transmission side and the reception side are aware, and detecting channel information using a distortion degree when the signal is received through a channel is mainly used. The above signal is referred to as a pilot signal or a reference signal (RS).

When transmitting and receiving data using multiple antennas, the channel states between the transmission antennas and the reception antennas should be detected in order to correctly receive the signal. Accordingly, each transmission antenna has an individual RS. In more detail, an independent RS should be transmitted through each Tx port.

RS may be divided into downlink RS and uplink RS. In the current LTE system, the uplink RS include:

i) DeModulation-Reference Signal (DM-RS) used for channel estimation for coherent demodulation of information delivered on a PUSCH and a PUCCH; and ii) Sounding Reference Signal (SRS) used for a BS (eNB) or a network to measure the quality of an uplink channel in a different frequency.

The downlink RS are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RS are transmitted;

v) Multimedia Broadcast Single Frequency Network (MBSFN) RS used for coherent demodulation of a signal transmitted in MBSFN mode; and vi) positioning RS used to estimate geographical position information about a UE.

RS may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that a BS (eNB) transmits along with downlink data in specific resources. A UE can demodulate the data by measuring a channel using the RS. This RS should be transmitted in a data transmission area.

CRS serve two purposes, that is, channel information acquisition and data demodulation. A UE-specific RS is used only for data demodulation. CRS are transmitted in every subframe in a broad band and CRS for up to four antenna ports are transmitted according to the number of Tx antennas in an eNB.

For example, if the BS (eNB) has two Tx antennas, CRS for antenna ports 0 and 1 are transmitted. In the case of four Tx antennas, CRS for antenna ports 0 to 3 are respectively transmitted.

FIG. 5 illustrates patterns in which CRS and DRS are mapped to a downlink RB pair, as defined in a legacy 3GPP LTE system (e.g. Release-8). An RS mapping unit, i.e. a downlink RB pair may include one subframe in time by 12 subcarriers in frequency. That is, an RB pair includes 14 OFDM symbols in time in the case of the normal CP (see FIG. 5(a)) and 12 OFDM symbols in time in the case of the extended CP (see FIG. 5(b)).

In FIG. 5, the positions of RS in an RB pair for a system where a BS (eNB) supports four Tx antennas are illustrated. Reference numerals 0, 1, 2 and 3 denote the REs of CRS for first to fourth antenna ports, antenna port 0 to antenna port 3, respectively, and reference character 'D' denotes the positions of DRS.

CSI (Channel Status Information) Feedback

MIMO schemes are classified into an open-loop MIMO scheme and a closed-loop MIMO scheme. The open-loop MIMO scheme means that a transmitter performs MIMO transmission without receiving CSI feedback information from a MIMO receiver. The closed-loop MIMO scheme means that a transmitter receives CSI feedback information from the MIMO receiver and performs MIMO transmission. In accordance with the closed-loop MIMO scheme, each of a transmitter and a receiver can perform beamforming on the basis of CSI so as to obtain a multiplexing gain of a MIMO transmission antenna. The transmitter (for example, BS) can allocate an uplink control channel or an uplink shared channel to a receiver (for example, a user equipment) in such a manner that the receiver can feed back the CSI.

The feedback CSI may include a rank indicator (RI), a precoding matrix index (PMI), and a channel quality indicator (CQI).

RI is information of a channel rank. The channel rank means a maximum number of layers (or streams) via which different information can be transmitted through the same time-frequency resources. Since a rank value is determined depending on long-term fading of a channel, the rank value is generally fed back for a longer period than PMI and CQI. That is, the rank value can be fed back less frequently than PMI and CQI.

PMI is information regarding a precoding matrix used for data transmission from the transmitter, and includes spatial characteristics of a channel. Precoding means that a transmit layer is mapped to a transmit antenna, and the layer-antenna mapping relationship can be determined by precoding matrices. PMI corresponds to a UE-preferred precoding matrix index of a BS on the basis of metric data such as Signal-to-Interference plus Noise Ratio (SINR). In order to reduce feedback overhead of the precoding information, a transmitter and a receiver may share a variety of precoding matrices in advance, and only indices indicating a specific precoding matrix from among the corresponding codebook can be fed back.

Acquisition of an additional multi-user diversity using Multi-User MIMO (MU-MIMO) is under consideration in a system supporting an extended antenna configuration (e.g. an LTE-A system). In MU-MIMO, an interference channel exists between UEs multiplexed in an antenna domain. Therefore, when the eNB transmits a downlink signal based on CSI feedback received from one UE, it needs to perform the downlink transmission in a manner that avoids interference with other UEs. Hence, for a reliable MU-MIMO operation, CSI should be fed back with more accuracy than for a Single-User MIMO (SU-MIMO) operation.

To enable more accurate CSI measurement and reporting, a new CSI feedback scheme may be used by improving conventional CSI including an RI, a PMI, and a CQI. For example, precoding information fed back by a receiver may be indicated by a combination of two PMIs. One of the two PMIs (a first PMI) may be referred to as W1 having a long term and/or wideband property and the other PMI (a second PMI) may be referred to as W1 having a short term and/or subband property. A final PMI may be determined by a function of W1 and W2. For example, let the final PMI be denoted by W. Then it may defined that W=W1*W2 or W=W2*W1.

CQI is information indicating channel quality or channel strength. CQI may be represented by a combination of predetermined MCSs. That is, a feedback CQI index may indicate a modulation scheme and a code rate. Generally, a reception SINR capable of being obtained when the BS constructs a spatial channel using a PMI is applied to CQI.

The current LTE/LTE-A system defines 'CSI reference resource' related to channel measurement for the above-described CSI feedback/reporting. The CSI reference resource is defined by a group of physical RBs corresponding to a frequency band for which a CQI is calculated in the frequency domain. From a time perspective, for CSI transmission/reporting in subframe n, the CSI reference resource is defined by a single downlink subframe, $n-n_{CQI\_ref}$ i) For periodic CSI reporting, $n-n_{CQI\_ref}$ is the smallest value greater than or equal to 4, which is a valid downlink subframe. ii) For aperiodic CSI reporting, $n-n_{CQI\_ref}$ is typically the reference resource in the same valid downlink subframe as a corresponding CSI request in a DCI format for uplink transmissions. iii) For aperiodic CSI reporting triggered by a Random Access Response Grant carrying a CSI request, $n-n_{CQI\_ref}$ equals 4. A downlink subframe is considered valid when it is configured as a downlink subframe for a particular UE, it is not an MBSFN subframe except for Mode 9, it contains a DwPTS with a predetermined size or larger, it does not fall within a configured measurement gap for that UE, and for periodic CSI reporting, it should be an element of a CSI subframe set when that UE is configured with CSI subframe sets. A higher layer may configure CSI subframe sets ($C_{CSI,0}$, $C_{CSI,1}$) for the UE. The current standard defines that the CSI reference resource is included in one of the two CSI subframe sets ($C_{CSI,1}$, $C_{CSI,1}$), not in both.

Heterogeneous Deployments

Figure 6:
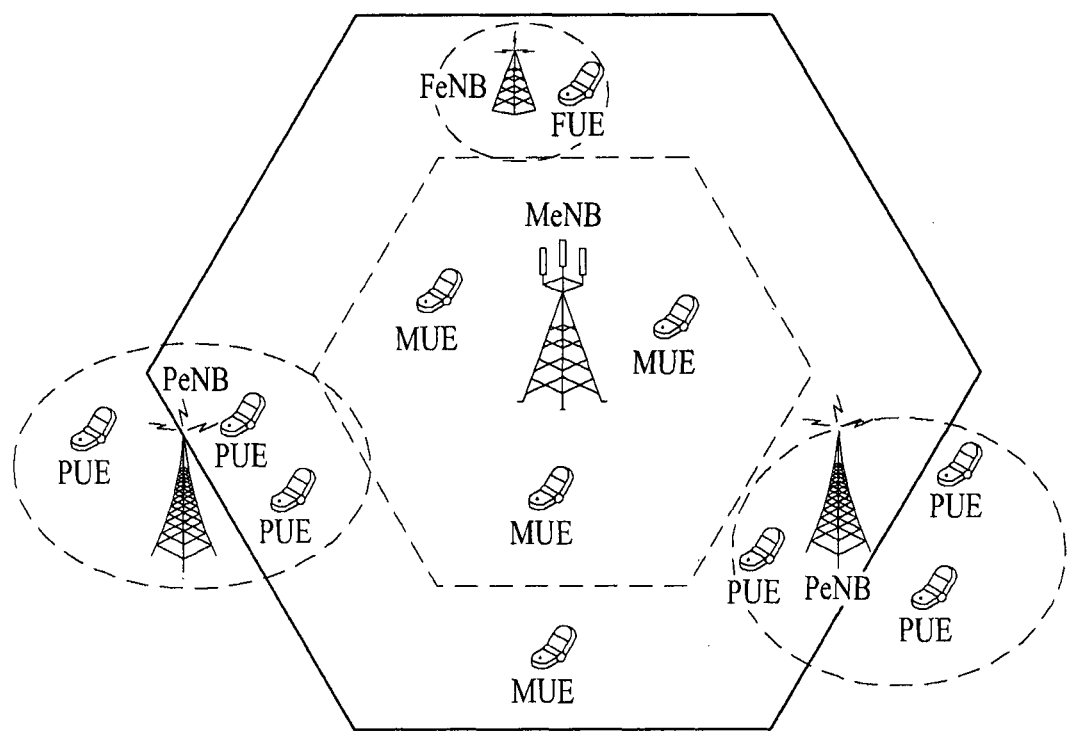
FIG. 6 is a conceptual diagram illustrating a cooperative transmission cluster.

FIG. 6 is a heterogeneous network wireless communication system including a macro eNB (MeNB) and a micro eNB (PeNB or FeNB). The term "heterogeneous network" refers to a network in which a macro eNB (MeNB) and a micro eNB (PeNB or FeNB) coexist even though the same Radio Access Technology (RAT) is used.

The macro eNB (MeNB) is a normal eNB having wide coverage and high transmission power in a wireless communication system. The macro eNB (MeNB) may also be referred to as a macro cell.

The micro eNB (PeNB or FeNB) may also be referred to as a micro cell, a pico cell, a femto cell, a home eNB (HeNB), a relay, etc. (MeNB, PeNB and FeNB may also be generically named a transmission point as necessary). The micro eNB (PeNB or FeNB) is a small-sized version of the macro eNB (MeNB), such that the micro eNB (PeNB or FeNB) may independently perform most of the functions of the macro eNB (MeNB). The micro eNB (PeNB or FeNB) may be installed (in an overlay manner) in an area covered by the macro eNB (MeNB) or may be installed (in a non-overlay manner) in a shadow area that cannot be covered by the macro eNB (MeNB). The micro eNB (PeNB or FeNB) has a narrower coverage and lower transmission power and may accommodate a smaller number of user equipments (UEs), compared to the micro eNB (MeNB).

UE, which is hereinafter referred to as a macro UE (MUE), may be directly served by the macro eNB (MeNB). UE, which is hereinafter referred to as a micro UE (MUE), may be served by the micro eNB (PeNB or FeNB). In some cases, the UE present within the coverage of the micro eNB (MeNB) may be served by the macro eNB (MeNB).

The micro eNB (eNB) may be classified into two types according to access limitations of the UE.

The first type is a Closed Subscriber Group (CSG) or non-Closed Access Subscriber Group (non-CSG) eNB serving as a cell that allows either a legacy macro UE or another micro eNB to access a micro UE. The legacy macro UE (MUE) or the like may be handed over to an OSG-type eNB.

The second type is a CSG eNB that prevents the legacy macro UE or another micro eNB from accessing the micro UE, such that it is impossible to be handed over to the CSG eNB.

Coordinated Multi-Point (CoMP)

According to the improved system performance requirements of the 3GPP LTE-A system, CoMP transmission/reception technology (may be referred to as co-MIMO, collaborative MIMO or network MIMO) is proposed. The CoMP technology can increase the performance of the UE located on a cell edge and increase average sector throughput.

In general, in a multi-cell environment in which a frequency reuse factor is 1, the performance of the UE located on the cell edge and average sector throughput may be reduced due to Inter-Cell Interference (ICI). In order to reduce the ICI, in the existing LTE system, a method of enabling the UE located on the cell edge to have appropriate throughput and performance using a simple passive method such as Fractional Frequency Reuse (FFR) through the UE-specific power control in the environment restricted by interference is applied. However, rather than decreasing the use of frequency resources per cell, it is preferable that the ICI is reduced or the UE reuses the ICI as a desired signal. In order to accomplish the above object, a CoMP transmission scheme may be applied.

The CoMP scheme applicable to the downlink may be largely classified into a Joint Processing (JP) scheme and a Coordinated Scheduling/Beamforming (CS/CB) scheme.

In the JP scheme, each point (eNodeB) of a CoMP unit may use data. The CoMP unit refers to a set of eNodeBs used in the CoMP scheme. The JP scheme may be classified into a joint transmission scheme and a dynamic cell selection scheme.

The joint transmission scheme refers to a scheme for transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively eliminate interference with another UE.

The dynamic cell selection scheme refers to a scheme for transmitting a PDSCH from one point (of the CoMP unit). That is, data transmitted to a single UE at a specific time is transmitted from one point and the other points in the cooperative unit at that time do not transmit data to the UE. The point for transmitting the data to the UE may be dynamically selected.

According to the CS/CB scheme, the CoMP units may cooperatively perform beamforming of data transmission to a single UE. Although only a serving cell transmits the data, user scheduling/beamforming may be determined by the coordination of the cells of the CoMP unit.

In uplink, coordinated multi-point reception refers to reception of a signal transmitted by coordination of a plurality of geographically separated points. The CoMP scheme applicable to the uplink may be classified into Joint Reception (JR) and Coordinated Scheduling/Beamforming (CS/CB).

The JR scheme indicates that a plurality of reception points receives a signal transmitted through a PUSCH, the CS/CB scheme indicates that only one point receives a PUSCH, and user scheduling/beamforming is determined by the coordination of the cells of the CoMP unit.

In this CoMP system, multi-cell BSs (eNBs) can support data for a UE. In addition, the BSs (eNBs) support one or more UEs simultaneously in the same radio frequency resources, thereby increasing system performance. The BSs (eNBs) may also operate in Space Division Multiple Access (SDMA) based on CSI between a UE and the eNBs.

A serving BS (eNB) and one or more cooperative BSs (eNBs) are connected to a scheduler through a backbone network in the CoMP system. The scheduler may receive channel information about the channel states between a UE and the cooperative eNBs, measured by each cooperative BS (eNB) and operate based on the channel information. For example, the scheduler may schedule information for cooperative MIMO for the serving BS (eNB) and the one or more cooperative BSs (eNBs). That is, the scheduler may transmit a command directly to each eNB in regard to the cooperative MIMO operation.

As can be seen from the above description, it can be recognized that a CoMP system operates as a virtual MIMO system by grouping a plurality of cells into one group. Basically, the CoMP system adopts a MIMO communication scheme using multiple antennas.

Figure 7:
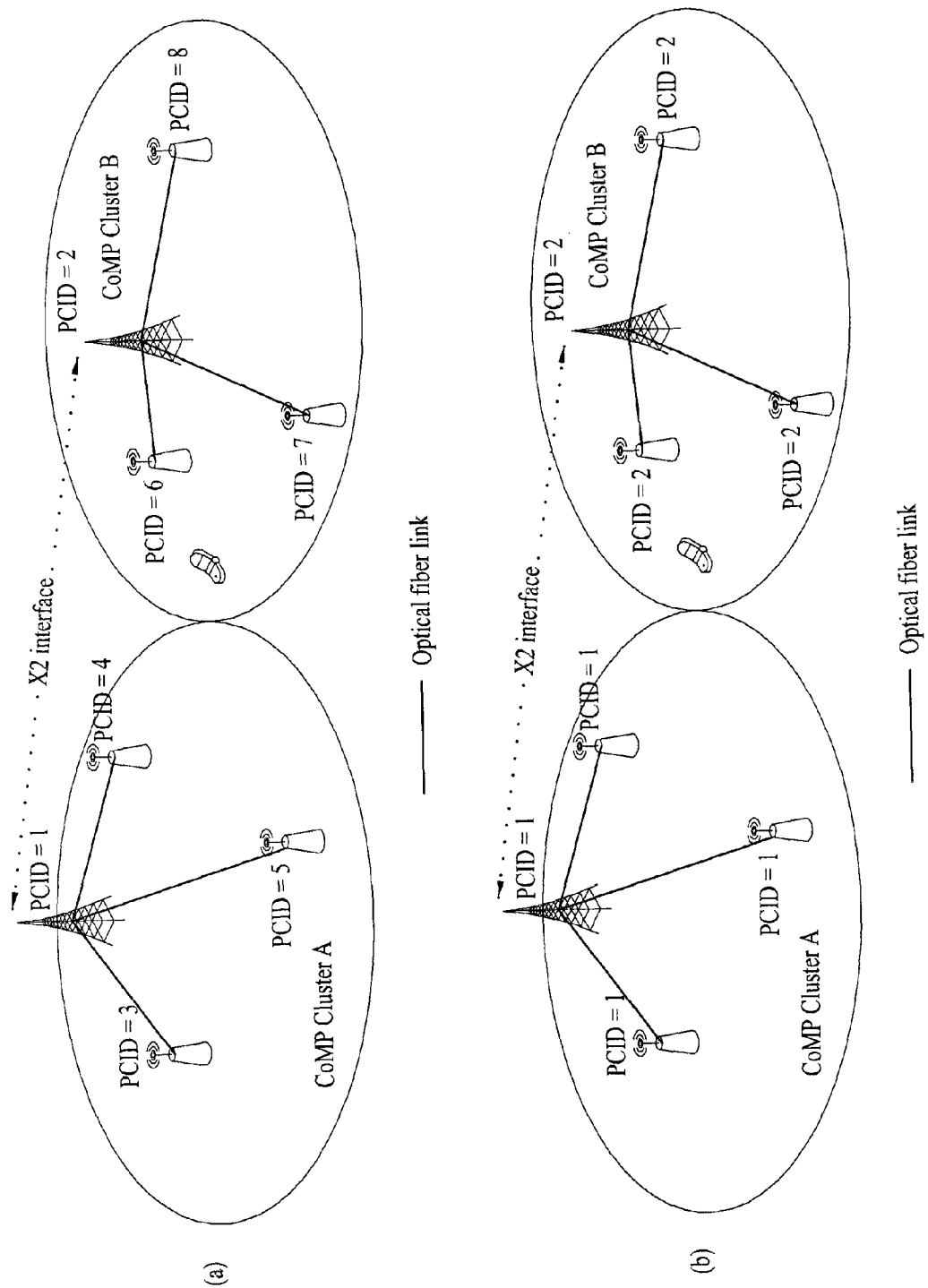
FIG. 7 is a conceptual diagram illustrating CoMP (Coordinated Multi Point) cluster.

A CoMP cluster is a set of cells that are capable of performing the CoMP operations (i.e., cooperative scheduling and cooperative data transmission/reception). For example, cells of a single cluster may be assigned different physical cell IDs (PCIDs) as shown in FIG. 7(a), and cells of a single cluster may share the same PCIDs such that the cells may be configured in the form of a distributed antenna or RRH of a single BS. In modified examples of FIG. 7, some cells from among cells of the single cluster may share the same PCIDs.

Generally, cells of the same CoMP cluster are interconnected through a backhaul link, such as an optical fiber having high capacity and low latency, so as to implement cooperative scheduling and cooperative data transmission/reception, such that the cooperative scheduling is possible and maintained at a correct time synchronization state, resulting in implementation of cooperative data transmission. In addition, when receiving signals from cells of the CoMP cluster participating in the cooperative transmission, the size of CoMP cluster must be determined in a manner that a reception time difference between signals transmitted from respective cells can enter the scope of a cyclic prefix (CP) length on the basis of a propagation delay difference between respective cells. In contrast, cells belonging to different clusters may be interconnected through a lower-capacity backhaul link, and may not maintain time synchronization.

A UE configured to perform CoMP can perform cooperative scheduling and cooperative data transmission/reception by some or all of cells contained in the CoMP cluster, and the UE measures a reference signal that is transmitted from some or all cells of the CoMP cluster according to a UE reception signal quality (i.e., QoS of a UE reception signal). In order to measure link performances of UE and each cell, the UE may measure a reference signal of each cell and may report a QoS of the measured reference signal. Specifically, cells to be measured by the UE may be defined as a CoMP measurement set.

For CoMP, there is a need to define the reference resource set through which UE channel measurement and UE channel measurement reporting must be performed, because the CoMP scheme and downlink scheduling, etc. of the corresponding UE are determined according to per-cell channel information to be reported by the UE on uplink. Information (i.e., the CoMP measurement set) indicating that the UE must measure/report signals from a certain cell should be transferred through higher layer signaling, and associated information can be signaled as CSI-RS resources.

Inter-Cell Interference Coordination (ICIC)

In the above-mentioned heterogeneous network environment (heterogeneous deployment) or CoMP environment, inter-cell interference (ICI) may occur. In order to solve the inter-cell interference (ICI) problem, an inter-cell interference coordination (ICIC) may be used.

As an exemplary ICIC of the frequency resource, the 3GPP LTE Release-8 system is designed to divide an overall frequency region (for example, a system bandwidth) into one or more sub-regions (for example, a physical resource block (PRB) unit), and a predetermined scheme for exchanging ICIC messages of individual frequency sub-regions between cells is defined in the 3GPP LTE Release-8 system. A variety of parameters may be contained in an ICIC message for frequency resources. For example, a Relative Narrowband Transmission Power (RNTP) related to downlink transmission power, uplink (UL) Interference Overhead Indication (IOI) related to uplink interference, UL High Interference Indication (HII), etc. may be defined in the ICIC message for frequency resources.

RNTP is information indicating downlink transmission power used in a specific frequency sub-region by a cell transmitting an ICIC message. For example, if an RNTP field for a specific frequency sub-region is set to a first value (for example, 0), this means that downlink transmission power of the corresponding cell does not exceed a predetermined threshold value in the corresponding frequency sub-region. Alternatively, if the RNTP field for the specific frequency sub-region is set to a second value (for example, 1), this means that the corresponding cell cannot promise downlink transmission power in the corresponding frequency sub-region. In other words, if the RNTP field is set to zero '0', this means that downlink transmission power of the corresponding cell is low in the corresponding frequency sub-region. Otherwise, if the RNTP field is set to 1, this means that downlink transmission power of the corresponding cell is not low in the corresponding frequency sub-region.

UL IOI is information indicating the amount of uplink interference experienced (or generated) in a specific frequency sub-region including a cell configured to transmit an ICIC message. For example, if an IOI field for a specific frequency sub-region has a high-interference amount, this means that the corresponding cell experiences high uplink interference in the corresponding frequency sub-region. In the frequency sub-region corresponding to an IOI indicating high uplink interference, the cell having received the ICIC message can schedule a UE that uses low uplink transmission power from among serving UEs of the cell. Therefore, since UEs perform uplink transmission at low transmission power in the frequency sub-region corresponding to an IOI indicating high uplink interference, uplink interference experienced by a neighbor cell (that is, a cell having transmitted the ICIC message) may be reduced.

UL HII indicates the degree of interference (or uplink interference sensitivity) that may be encountered in the corresponding frequency sub-region because of uplink transmission within a cell configured to transmit the ICIC message. For example, if the HII field is set to a first value (for example, 1) in a specific frequency sub-region, there is a high possibility of scheduling a high uplink transmission power UE by a cell for transmission of the ICIC message in the corresponding frequency sub-region. On the other hand, if the HII field is set to a second value (for example, 0) in a specific frequency sub-region, there is a possibility of scheduling a low uplink transmission power UE by the cell for transmission of the ICI message in the corresponding frequency sub-region. Meanwhile, if a UE is first scheduled in a frequency sub-region in which an HII is set to a second value (for example, 0) and some UEs capable of properly operating even under high interference are scheduled in another frequency sub-region in which an HII is set to a first value (for example, 1), one cell having received the ICIC message can avoid interference from another cell having transmitted the ICIC message.

Meanwhile, as an exemplary ICIC of the time resource, the 3GPP LTE-A system (or 3GPP LTE Release-10) system is designed to divide an overall time region into one or more sub-regions (for example, a subframe unit) in a frequency domain, and a predetermined scheme for exchanging specific information indicating silencing or non-silencing of individual frequency sub-regions between cells is defined in the 3GPP LTE-A system. The cell having transmitted the ICIC message may transmit specific information indicating the presence of silencing in a specific subframe to neighbor cells, and does not schedule a PDSCH and a PUSCH in the corresponding subframe. On the other hand, the cell having received the ICIC message can schedule uplink transmission and/or downlink transmission for a UE on a subframe in which silencing is performed in another cell having transmitted the ICIC message.

Silencing may refer to an operation of a specific cell within a specific subframe. That is, the silencing operation indicates that a specific cell does not perform most of signal transmission on uplink or downlink of a specific subframe. If necessary, the silencing operation may also indicate that a specific cell can transmit signals at no power or low power on uplink and downlink of a specific subframe. As an example of the silencing operation, a specific cell may configure a specific subframe as a Multicast-Broadcast Single Frequency Network (MBSFN) subframe. In a downlink subframe configured as the MBSFN subframe, a signal is transmitted only in a control region and is not transmitted in a data region. As another example of the silencing operation, a cell causing interference may configure a specific frame as a specific Almost Blank Subframe (ABS) or an ABS-with-MBSFN. The ABS refers to a subframe in which only a CRS is transmitted in a control region and a data region of a downlink subframe and the remaining control information and data other than the CRS are not transmitted in the control and data regions of the downlink subframe. If necessary, signals are transmitted at no power or low power in the subframe corresponding to the ABS. Nonetheless, downlink channels and downlink signals such as a Physical Broadcast Channel (PBCH), a Primary Synchronization Signal (PSS), and a Secondary Synchronization Signal (SSS) may be transmitted even in the ABS. The ABS-with-MBSFN may mean a subframe in which even the CRS is not transmitted in the data region of the above-described ABS. As described above, silencing may be performed in units of a specific subframe, and information indicating whether silencing is performed is referred to as a silent subframe pattern.

In association with ABS, ABS signaling defined in 3GPP LTE-A is largely classified into ABS information and an ABS status. The ABS information indicates a subframe to be used as ABS using bitmap. The ABS information is composed of 40 bits in case of FDD, and is composed of a maximum of 70 bits in case of TDD. The number of bits used for ABS information in TDD may be changed according to UL-DL configuration. In case of FDD, 40 bits indicate 40 subframes. If the value of a bit is set to 1, the bit indicates ABS. If the value of a bit is set to zero, the bit indicates non-ABS. When restricted measurement is configured in a UE, the number of CRS antenna ports of the corresponding cell is notified for CRS measurement. A measurement subset is a subset of ABS pattern information. The measurement subset is a bitmap composed of 40 bits in case of FDD, and is a bitmap composed of a maximum of 70 bits in case of TDD. The above information can be understood as a restricted measurement for configuring restricted measurement. Table 1 indicates ABS information defined in the legacy LTE/LTE-A system.

TABLE 1

| IE/Group Name | Presence | Range | IE type and reference | Semantics description |
| --- | --- | --- | --- | --- |
| CHOICE ABS Information | M | | — | — |
| >FDD | | | — | — |
| >>ABS Pattern Info | M | | BIT STRING (SIZE(40)) | Each position in the bitmap represents a DL subframe, for which value "1" indicates 'ABS' and value "0" indicates 'non ABS'. The first position of the ABS pattern corresponds to subframe 0 in a radio frame where SFN = 0. The ABS pattern is continuously repeated in all radio frames. The maximum number of subframes is 40. |

TABLE 1-continued

| IE/Group Name | Presence | Range | IE type and reference | Semantics description |
|---|---|---|---|---|
| >>Number Of Cell-specific Antenna Ports | M | | ENUMERATED (1, 2, 4, . . . ) | P (number of antenna ports for cell-specific reference signals) defined in TS 36.211 [10] |
| >>Measurement Subset | M | | BIT STRING (SIZE(40)) | Indicates a subset of the ABS Pattern Info above, and is used to configure specific measurements towards the UE. |
| >TDD | | | — | — |
| >>ABS Pattern Info | M | | BIT STRING (1 . . . 70, . . . ) | Each position in the bitmap represents a DL subframe for which value "1" indicates 'ABS' and value "0" indicates 'non ABS'. The maximum number of subframes depends on UL/DL subframe configuration. The maximum number of subframes is 20 for UL/DL subframe configuration 1~5; 60 for UL/DL subframe configuration 6; 70 for UL/DL subframe configuration 0. UL/DL subframe configuration defined in TS 36.211 [10]. The first position of the ABS pattern corresponds to subframe 0 in a radio frame where SFN = 0. The ABS pattern is continuously repeated in all radio frames, and restarted each time SFN = 0. |
| >>Number Of Cell-specific Antenna Ports | M | | ENUMERATED (1, 2, 4, . . . ) | P (number of antenna ports for cell-specific reference signals) defined in TS 36.211 [10] |
| >>Measurement Subset | M | | BIT STRING (1 . . . 70, . . . ) | Indicates a subset of the ABS Pattern Info above, and is used to configure specific measurements towards the UE |
| >ABS Inactive | M | | NULL | Indicates that interference coordination by means of almost blank sub frames is not active |

Table 2 shows ABS status information elements (IEs) defined in the legacy LTE/LTE-A system. The ABS status information elements are used to enable the eNB to determine whether the ABS pattern must be changed. In Table 2, 'Usable ABS Pattern Info' is bitmap information of a subset of ABS pattern information, and indicates whether a subframe designated as ABS has been correctly used for interference reduction. 'DL ABS status' indicates the ratio of the number of DL RBs scheduled in a subframe indicated by 'Usable ABS Pattern Info' to the number of RBs allocated for a UE to be protected through ABS. 'DL ABS status' may also indicate whether ABS has been efficiently used in a victim cell according to its own purpose.

TABLE 2

| IE/Group Name | Presence | Range | IE type and reference | Semantics description |
|---|---|---|---|---|
| DL ABS status | M | | INTEGER (0 . . . 100) | Percentage of used ABS resources. The numerator of the percentage calculation consists of resource blocks within the ABS indicated in the Usable ABS Pattern Info IE allocated by the $eNB_2$ for UEs needing protection by ABS from inter-cell interference for DL scheduling, or allocated by the $eNB_2$ for other reasons (e.g. some control channels). The denominator of the percentage calculation is the total quantity of resource blocks within the ABS indicated in the Usable ABS Pattern Info IE. |
| CHOICE Usable ABS Information | M | | — | — |
| >FDD | | | — | — |
| >>Usable ABS Pattern Info | M | | BIT STRING (SIZE(40)) | Each position in the bitmap represents a subframe, for which value "1" indicates 'ABS that has been designated as protected from inter-cell interference by the $eNB_1$, and available to serve this purpose for DL scheduling in the $eNB_2$' and value "0" is used for all other subframes. The pattern represented by the bitmap is a subset of, or the same as, the corresponding ABS Pattern Info IE conveyed in the LOAD INFORMATION message from the $eNB_1$. |

TABLE 2-continued

| IE/Group Name | Presence | Range | IE type and reference | Semantics description |
|---|---|---|---|---|
| >TDD | | | — | — |
| >>Usable ABS Pattern Info | M | | BIT STRING (1 ... 70) | Each position in the bitmap represents a subframe, for which value "1" indicates 'ABS that has been designated as protected from inter-cell interference by the $eNB_1$, and available to serve this purpose for DL scheduling in the $eNB_2$' and value "0" is used for all other subframes. The pattern represented by the bitmap is a subset of, or the same as, the corresponding ABS Pattern Info IE conveyed in the LOAD INFORMATION message from the $eNB_1$. |

A measurement subset composed of a subset of an ABS pattern is a subframe statically used as ABS, and the remaining subframes contained in the ABS pattern may determine whether a transmission point will be used as the ABS according to traffic load.

Measurement/Measurement Report

A measurement report is used for many techniques designed to ensure the mobility of UEs (handover, random access, cell search, etc.) or for one of the techniques. Since the measurement report needs a certain degree of coherent demodulation, a UE may perform measurement after acquiring synchronization and physical layer parameters, except for measurement of a received signal strength. The measurement report conceptually covers Radio Resource Management (RRM) measurement of measuring the signal strengths or signal strengths to total reception power of a serving cell and neighbor cells, including Reference Signal Received Power (RSRP), Received Signal Strength Indicator (RSSI), and Reference Signal Received Quality (RSRQ), and Radio Link Monitoring (RLM) measurement of measuring link quality with respect to the serving cell to thereby determine whether a radio link has been failed.

In association with Radio Resource Management (RRM), RSRP is defined as the linear average over the power contributions of REs that carry downlink CRS. RSSI is defined as the linear average of the total received power of a UE. The RSSI is measured from OFDM symbols carrying RS for antenna port 0, including interference and noise power from neighbor cells. If a specific subframe is indicated for RSRQ measurement by higher-layer signaling, the RSSI is measured over all OFDM symbols of the indicated subframe. RSRQ is defined as (NxRSRP/RSSI), where N is the number of RBs over the measurement bandwidth of RSSI.

The purpose of RLM execution is to enable a UE to monitor a downlink quality of its own serving cell, such that the UE can determine 'in-sync' or 'out-of-sync' of the corresponding cell. In this case, RLM is based on CRS. A downlink quality estimated by the UE is compared with each of 'in-sync threshold (Qin)' and 'out-of-sync threshold (Qout)'. Each threshold value may be denoted by a PDCCH BLER (Block Error Rate) of a serving cell. Specifically, Qout may correspond to a BLER of 10%, and Qin may correspond to a BLER of 2%. Actually, Qin and Qout correspond to SINR of the received CRS. If CRS reception SINR is equal to or higher than a predetermined level (Qin), the UE decides to attach the corresponding cell. If CRS reception SINR is less than a predetermined level (Qout), the UE declares a radio link failure (RLF).

As can be seen from the above-mentioned RSRP definition, it should be premised that measurement reporting is performed using CRS. However, assuming that cells share the same PCID as shown in FIG. 7(b), the cells are unable to discriminate between the cells having the same PCID on the basis of the CRS, such that it is impossible to perform RRM of each cell using only measurement reporting including RSRP/RSRQ based on CRS. Therefore, assuming that cells have the same PCID, it is possible to perform additional RSRP/RSRQ measurement reporting on the basis of CSI-RS being independently transmitted. In order to increase reception accuracy during CSI-RS reception of a specific cell, neighbor cells do not transmit signals to a resource element (RE) to which the corresponding CSI-RS is transmitted, such that the neighbor cells can perform higher-accuracy measurement although a frequency of CRS-RS transmission is less than a frequency of CRS transmission. Therefore, although cells have different PCIDs, CRS-based RSRP/RSRQ measurement reporting and CSI-RS RSRP/RSRQ measurement reporting are simultaneously performed, resulting in increased accuracy of a network RRM.

Another purpose of CSR-RS transmission in each cell is to perform CSI feedback to be performed by a UE to aid scheduling of a BS (eNB) that determines a rank, precoding matrix, a modulation and coding scheme (MCS) or CQI to be used for DL data transmission between the corresponding cell and the UE. In accordance with the CoMP transmission scheme, the UE must feed back a CSI to a downlink related to a cooperative cell other than the serving cell. An excessive amount of overhead occurs when CSIs of all cells contained in the CoMP cluster including the serving cell are fed back, such that CSIs of some cells (i.e., CoMP measurement set) contained in the CoMP cluster that is valuable in cooperative scheduling and cooperative data transmission. Deciding of the CoMP measurement set of a specific UE may be configured by selecting cells each having an RSRP of a predetermined level or higher. To achieve the above-mentioned operation, the UE performs RSRP measurement reporting of cells contained in the CoMP cluster including the UE. Alternatively, the BS sets configurations of CSI_RS each of which will perform RSPR or RSRQ measurement to a CoMP measurement set, and informs the UE of the resultant configurations. The UE may perform RSRP or RSRQ measurement of CSI-RS transmitted from cells contained in the CoMP management set. If the measurement result satisfies a specific condition, the UE may perform reporting.

In order to implement ICIC between CoMP clusters, a UE performs RSRP measurement and reporting of cells contained in a contiguous CoMP cluster, such that a network and a UE can recognize which one of cells of the contiguous CoMP cluster gives strong interference to the corresponding UE and can also recognize which one of cells receives strong UL interference from the corresponding UE.

In addition to CRS based RSRP/RSRQ measurement reporting for mobility management of UE handover, the CoMP measurement set configuration and the CSI-RS based RSRP/RSRQ measurement reporting for ICIC are simultaneously performed, such that accuracy and flexibility of network RRM can be increased.

Restricted Measurement

If a cell reduces a transmission (Tx) power of a specific resource region, a variation width of a per-resource-region interference signal received by a contiguous cell is increased. If averaging of the interference signals is achieved irrespective of a resource region, it is difficult to correctly obtain CoMP and ICIC effects. A detailed description thereof will hereinafter be described with reference to FIG. 8.

Figure 8:
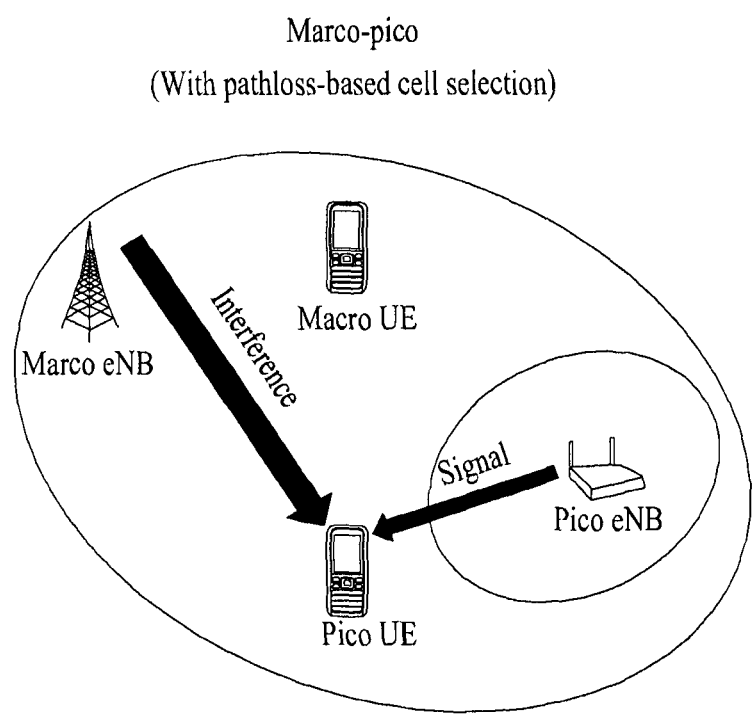
FIG. 8 is a conceptual diagram illustrating restricted measurement.

Referring to FIG. 8, in case of a normal situation, a macro cell (macro eNB) is used as an aggressor cell of a pico cell (pico eNB). The macro cell (macro eNB) can guarantee/protect performance of the pico cell (pico eNB) using the aforementioned ABS for the pico cell or pico UE. In more detail, the macro cell can deboost a maximum of 9bB transmission power in specific subframe(s), or may not transmit signals in the specific subframe(s), resulting in the cell range extension (CRE) effect of the pico cell. In other words, if a macro cell reduces a downlink transmission power in the ABS, a UE located in the vicinity of a cell edge of cells can recognize that performance of a picocell signal having been received with a noise level or lower in a normal subframe is increased in a manner that data can be stably received in the ABS, such that cell coverage of a pico cell can be actually extended.

Under this situation, restricted measurement may be used for measurement reporting. In other words, if the macro cell reduces a transmission power in a specific subframe through the ABS, signals and/or interference level of the pico cell seen by the UE is greatly changed per subframe, and it is prevented that signals are simply averaged due to introduction of the restricted measurement.

For such restricted measurement, if several CSI subframe sets (e.g., C0, C1) for channel measurement are used as a higher layer signal, the UE can perform channel measurement and reporting dedicated for the CSI subframe set. In addition, it is desirable that the UE may perform ABS measurement of the macro cell for RLM/RRM.

Cell Range Extension (CRE)

Several small-sized pico eNBs (BSs) are installed in a coverage of the macro BS, such that UEs covered by the macro BS are handed over to the pico BS, resulting in traffic dispersion of the macro BS. Handover from a serving BS to a target BS is achieved when target-BS measurement result obtained from the UE is identical to or higher than a predetermined threshold value ($S_{th\_conv}$). In this case, the network improves UE capability using arbitrary means, such that handover can be performed even though signal strength (e.g., SNR) of the target BS is less than a predetermined threshold. The above-mentioned operation may be referred to as a cell range expansion (CRE). A CRE enable region is referred to as a CRE region/area, and the CRE region may be represented by a specific region in which a reception performance ($S_{received}$) of a reference signal of the corresponding BS is higher than a new threshold value ($S_{th\_CRE}$) for CRE. That is, the CRE region configures the following equation 1.

$$S_{th\_conv} \geq S_{received} \geq S_{th\_CRE}$$ [Equation 1]

For better understanding of the present invention, a CRE region configured to satisfy Equation 1 may correspond to a shaded part.

Figure 9:
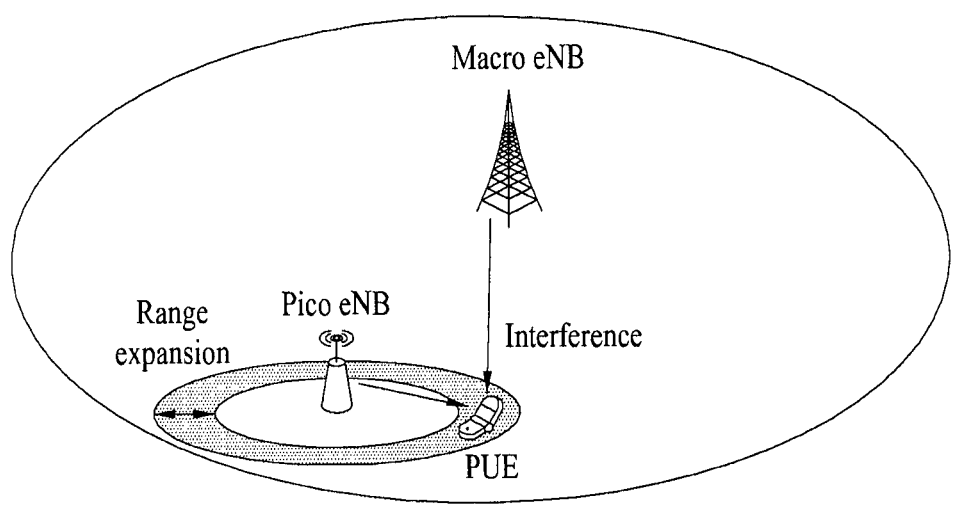
FIG. 9 is a conceptual diagram illustrating Cell Ranging Expansion (CRE).

In FIG. 9, a macro eNB enables a PUE located in the CRE region to be handed over to a pico eNB (PeNB), resulting in implementation of traffic offloading. As a result, overall system performance is improved. The CRE can extend a cell range or a cell radius of the corresponding eNB. In the legacy LTE/LTE-A system, a reference signal reception intensity of the PeNB may be denoted by RSRP/RSRQ, a reference for enabling the UE to attach a specific cell satisfies a specific condition in which a difference between the best RSRP and a specific cell RSRP is 6 dB or less on the basis of per-cell RSRP. However, in order to increase the traffic dispersion effect to the PeNB, the reference may be adjusted to 6 dB (e.g., 9 dB) or higher. In this case, the operation (i.e., CRE) for enabling the UE to measure the PeNB, when the UE performs handover to the PeNB and then measures the PeNB acting as a serving cell, influence of interference caused by the macro eNB (that is located close to the PeNB and includes other BSs not shown in drawings may be further increased unavoidably. Therefore, the following description discloses a variety of methods for solving various interference problems encountered when a reference is higher than the CRE reference.

FIG. 10 is a conceptual diagram illustrating summaries of detailed proposals according to embodiments of the present invention.

In FIG. 10, it is premised that a UE configured to use a macro eNB as a serving cell is located in the CRE region of 6 dB or higher contained in the pico eNB (PeNB). It is also premised that timing points (e.g., radio frame boundary or subframe boundary, etc.) of the macro eNB and the pico eNB are synchronized within the range of a predetermined degree (e.g., 3 μs), or timing points of two cells are identical to each other.

In addition, the UE may have Further enhanced ICIC (FeICIC) capability capable of supporting FeICIC. In this case, FeICIC means that a pico eNB performs CRE of at least 6 dB and at the same time the macro eNb and the pico eNB perform time/frequency ICIC. There are a variety of UE capabilities related to FeICIC capability, for example, CRS interference cancellation (CRS IC) capability (including the number of CRS to cancel, the number of CRS capable of being cancelled in one subframe, and information indicating how many cells can be CRS-cancelled) capable of performing cancellation of CRS interference, PSS/SSS IC capability (including the number of PSSs/SSSs to cancel, the number of PSSs/SSSs capable of being cancelled in one subframe, and information indicating how many cells can be PSS/SSS-cancelled) capable of cancelling PSS/SSS interference of a contiguous cell, PBCH IC capability (including the number of PBCHs to cancel, the number of PBCHs capable of being cancelled in one subframe, and information indicating how many cells can be PBCH-cancelled) capable of cancelling PBCH interference of a contiguous cell. Hereinafter, the UE capability related to FeICIC capability will be referred to as CRE-related capability. UE capability information related to CRE may be transferred from a UE to a core network after RRC connection. In more detail, after the UE performs RRC connection, the core network transmits UEcapabilityEnquiry information to the UE through NAS (Non-Access Stratum) signaling, and the UE transmits UE capability information in response to the received UECapabilityEnquiry information. If necessary, the core network may transmit the UECapabilityEnquiry information.

Referring to FIG. 10(a), a macro eNB acting as a serving cell may transmit a command for measuring neighbor cell(s) and a pico eNB to the UE including FeICIC capability. Therefore, if the UE measures the pico eNB, it may be impossible for the UE to measure the pico eNB without receiving the help of a network because interference transmitted from the macro eNB occurs. Furthermore, the UE may fail to obtain picocell synchronization (PSS/SSS reception) needed for measurement due to the occurrence of interference from the macro eNB. Although the UE has CRE-related capability (specifically, CRS IC capability), assuming that the UE does not recognize which cell of the pico eNB is a main interference causing cell or does not recognize which one of CRS configurations must be cancelled, the UE may have difficulty in achieving synchronization acquisition/measurement.

In relation to the above-mentioned problem, the embodiment of the present invention will disclose signaling, process, etc. needed for the UE having obtained synchronization of a neighbor cell including high interference under the above-mentioned situation.

If the UE measures a neighbor cell under high interference and receives a handover command of a serving cell for a high-level (6 dB or higher) CRE, the UE needs to receive a PBCH of the neighbor cell when being handed over to the neighbor cell (i.e., state transition from FIG. 10a to FIG. 10b). However, the UE may have difficulty in receiving a PBCH of the neighbor cell due to a PBCH of a cell acting as an interference source (macro eNB of FIG. 10b). The above-mentioned operation may also be applied to the case of receiving other system information without change. In association with the above-mentioned description, signaling, process, etc. needed for correctly transferring system information including a PBCH to the UE will hereinafter be described in detail.

Continuously, according to the embodiment of the present invention, the UE may have difficulty in measuring the serving cell even when handover to the neighbor cell (e.g., pico eNB of FIG. 10a) under high interference. In other words, there is a high possibility that a UE configured to use a high-interference cell (e.g., pico eNB of FIG. 10b) as a serving cell has difficulty in correctly measuring its own serving cell due to a neighbor cell (e.g., a macro eNB of FIG. 10b) causing high interference. Therefore, the embodiment of the present invention will disclose signaling, process, etc. related to the serving cell measurement to solve the above-mentioned problems.

In summary, the following description will sequentially disclose: i) acquisition of synchronization of a neighbor cell under high interference; ii) measurement of a neighbor cell under high interference; iii) acquisition of system information of a neighbor cell under high interference; and iv) measurement of a serving cell under high interference.

In the following description, the term 'measurement' refers to measurement of at least one of RRM/RLM/CSI unless specially noted, and each of the neighbor cell receiving interference and the serving cell receiving interference may be referred to as a weak cell or a victim cell, and a cell causing interference may be referred to as an aggressor cell.

Synchronization Acquisition of Neighbor Cell under High Interference

In accordance with a method for synchronization acquisition of a neighbor cell (i.e., a weak cell) receiving high interference from neighbor cells, if the UE has FeICIC capability and PSS/SSS IC capability, the eNB (BS) may allow the UE to directly receive PSS/SSS of the weak cell such that the UE can acquire necessary information. In more detail, the eNB gives the list of weak cells (i.e., the list of neighbor cells to be described later) to the UE, and may command the UE to perform cell acquisition of the corresponding cell using the PSS/SSS IC. In this case, information indicating who an aggressor cell for weak cells is may be omitted as necessary, and the UE can detect PSS/SSS of the weak cell without using information of the aggressor cell.

In accordance with another method, a serving cell may inform a UE having FeICIC capability of specific information indicating which aggressor cell is synchronized with a specific weak cell, and the serving cell may command the UE having received such information to perform CRS measurement without detecting PSS/SS of the corresponding cell. That is, in order to measure a neighbor cell of a UE by the eNB, the list of weak cells to be measured by the UE should be transferred, and RSRP/RSRQ of these cells can be measured only in a specific subframe. In addition, information indicating which macro eNB has been synchronized in these cells is provided. In this case, provision of the information regarding synchronization with a certain macro eNB may enable the UE to measure RSRP/RSRQ without detecting PSS/SSS of a weak cell, because a signal intensity is high in a manner that the UE can perform PSS/SSS detection and specific weak cells inform the UE of the same radio frame boundary/subframe boundary as those of the corresponding macro eNB.

In this case, it is impossible to recognize TDD/FDD information, CP type information, etc. capable of being recognized in PSS/SSS detection. For this purpose, information regarding the macro eNB having an aggressor relationship per weak cell is transferred to the UE. In this case, the macro eNB may have the same duplex (TDD/FDD) scheme as those of the corresponding weak cell, and may have the same CP type as in the corresponding weak cell. In association with the CP type, a network (macro eNBs configured to use the ABS and the pico eNBs configured to receive the help) in which the ABS is configured may have the same CP type. The UE may operate on the assumption that the macro eNB and the pico eNB have the same CP type. Alternatively, the multiplexing schemes of individual weak cells, the CP type, and other system information may be further notified as necessary.

Measurement of Neighbor Cell under High Interference

A UE having received a command for measuring a neighbor cell (weak cell) serving has to measure a reference signal of the corresponding cell after synchronization acquisition of weak cells. From the viewpoint of CRS, the UE measures intensity of CRS reception signals of neighbor cells and must report the measurement result to the eNB. The CRS reception intensity may be represented by RSRP/RSRQ. In order to correctly measure the CRS of each weak cell, it is necessary for the UE to properly process CRS interference of eNBs.

Provided that FeICIC capability is set and CRS IC capability is set, the eNB can transmit the list of weak cells to be measured to the corresponding UE. When the eNB transmits a measurement execution command to the UE, the eNB can transmit reference signal information (e.g., CRS information) of a neighbor cell (aggressor cell, for example, a macro eNB adjacent to a pico cell) causing interference to cell(s) contained in the weak-cell list. In this case, CRS information of contiguous macro eNBs may include a cell ID, a CRS port number, and information of time/frequency domains to which CRS is transmitted. Detailed information related to RS information will be disclosed later. When the UE having received the above information measures a specific cell contained in the weak-cell list, RS cancellation is performed using CRS information of the specific cell, such that the UE may report the measurement result from which influence of interference is removed. If the eNB performs PDSCH mapping through CRS rate-matching and transmits CRS information to inform the UE of the mapped result, the eNB may transmit CRS information of a neighbor cell irrespective of the CRS IC capability of a UE, differently from the above-mentioned explanation.

Figure 11:
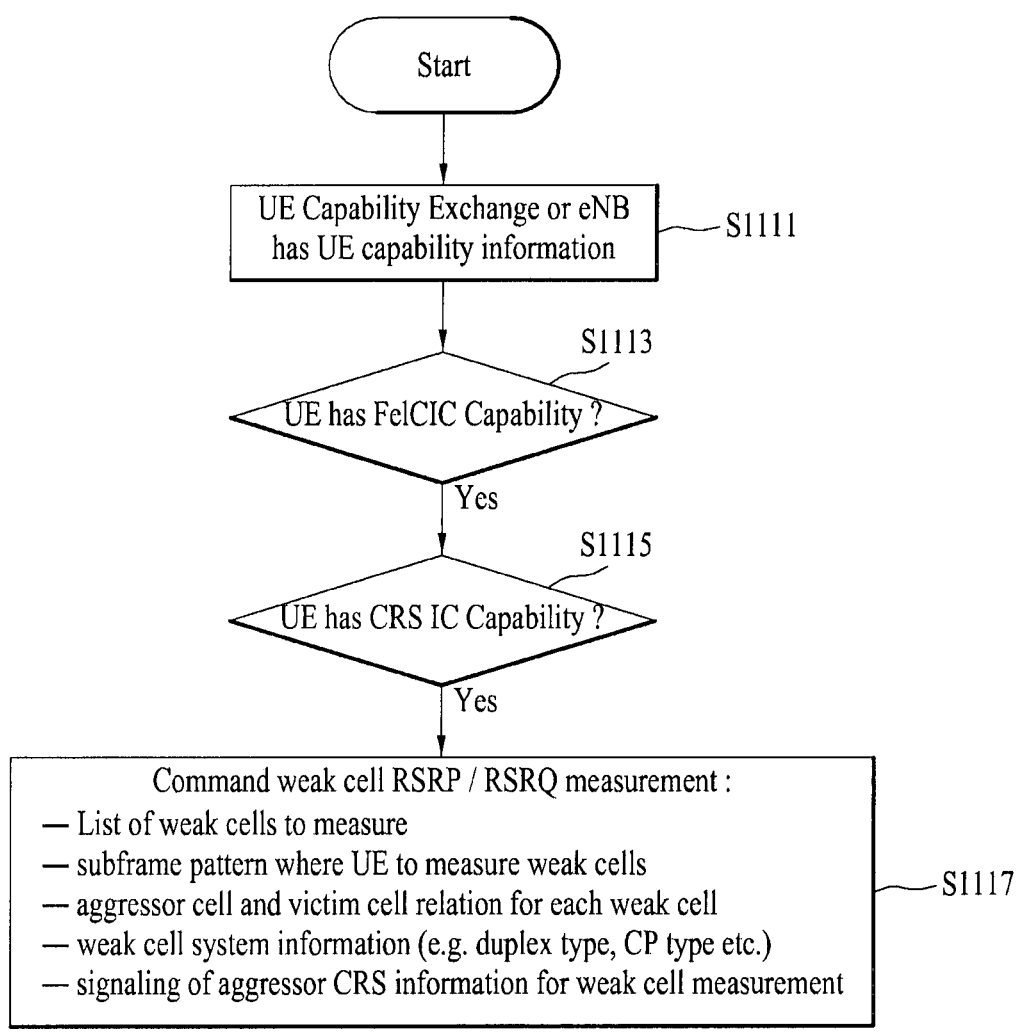
FIGS. 11 to 13 are flowcharts illustrating methods for measuring a neighbor cell according to embodiments of the present invention.
Figure 12:
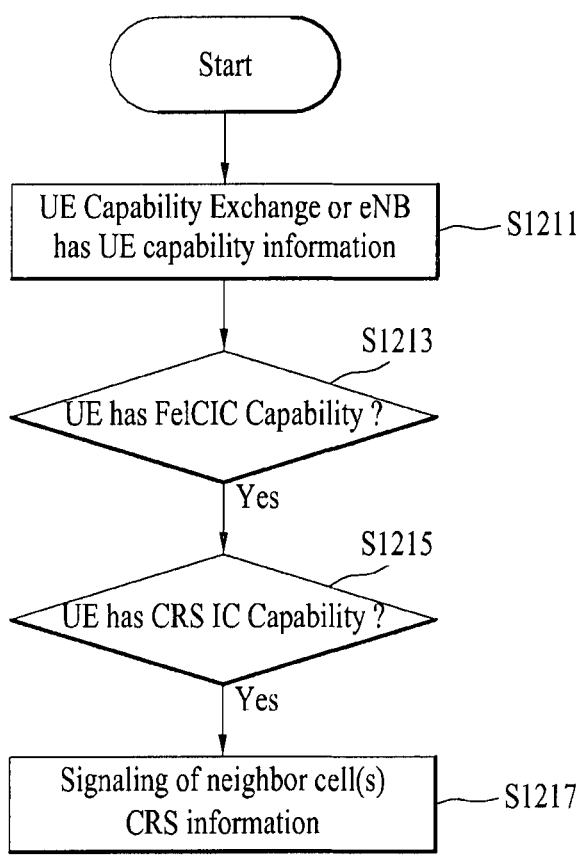

FIGS. 11 and 12 are flowcharts illustrating a method for enabling the eNB to transmit a measurement command. Referring to FIG. 11, the eNB confirms UE capability information in step S1111. In this case, the UE capability information relates to CRE related capability, such as FeICIC capability, CRS IC capability, etc. If the eNB does not have the UE capability information, the eNB may perform the UE capability information exchange procedure. If the UE has FeICIC capability in step S1113, it is determined whether the UE has CRS IC capability in step S1115. Assuming that the UE has CRS IC capability, when the eNB commands the UE to measure a weak cell, the eNB may include i) the list of weak cells to be measured, ii) a subframe pattern which will measure a weak cell, iii) relationship between an aggressor cell and a victim cell for each weak cell, iv) system information of a weak cell (e.g., duplex type, CP length, etc.), and v) CRS information of an aggressor cell for weak-cell measurement.

FIG. 12 is a flowchart illustrating a method for signaling CRS information of a neighbor cell on the basis of UE capability information. Referring to FIG. 12, steps other than step S1217 are replaced with those of FIG. 11. If the UE has FeICIC capability and CRS IC capability, the UE certainly provides CRS information of aggressor cells of weak cells, and requires measurement of each weak cell. In this case, since there is a high possibility that UE battery power can be excessively consumed, the eNB may command the corresponding UE to measure a weak cell as necessary. For example, if the corresponding UE may be located in the CRE region of a neighbor pico eNB, the eNB may command the UE to measure the weak cell. Under the condition that the eNB has difficulty in correctly recognizing whether the UE is located in the CRE region, if specific events i), ii) and iii) occur (where i) a CQI level reported by a UE is continuously equal to or less than a predetermined CQI level, ii) successive errors occur in DL data for the corresponding UE or UL data, iii) a UE average throughput is equal to or less than a predetermined throughput), the eNB can estimate that the corresponding UE has been located in the CRE region.

Figure 13:
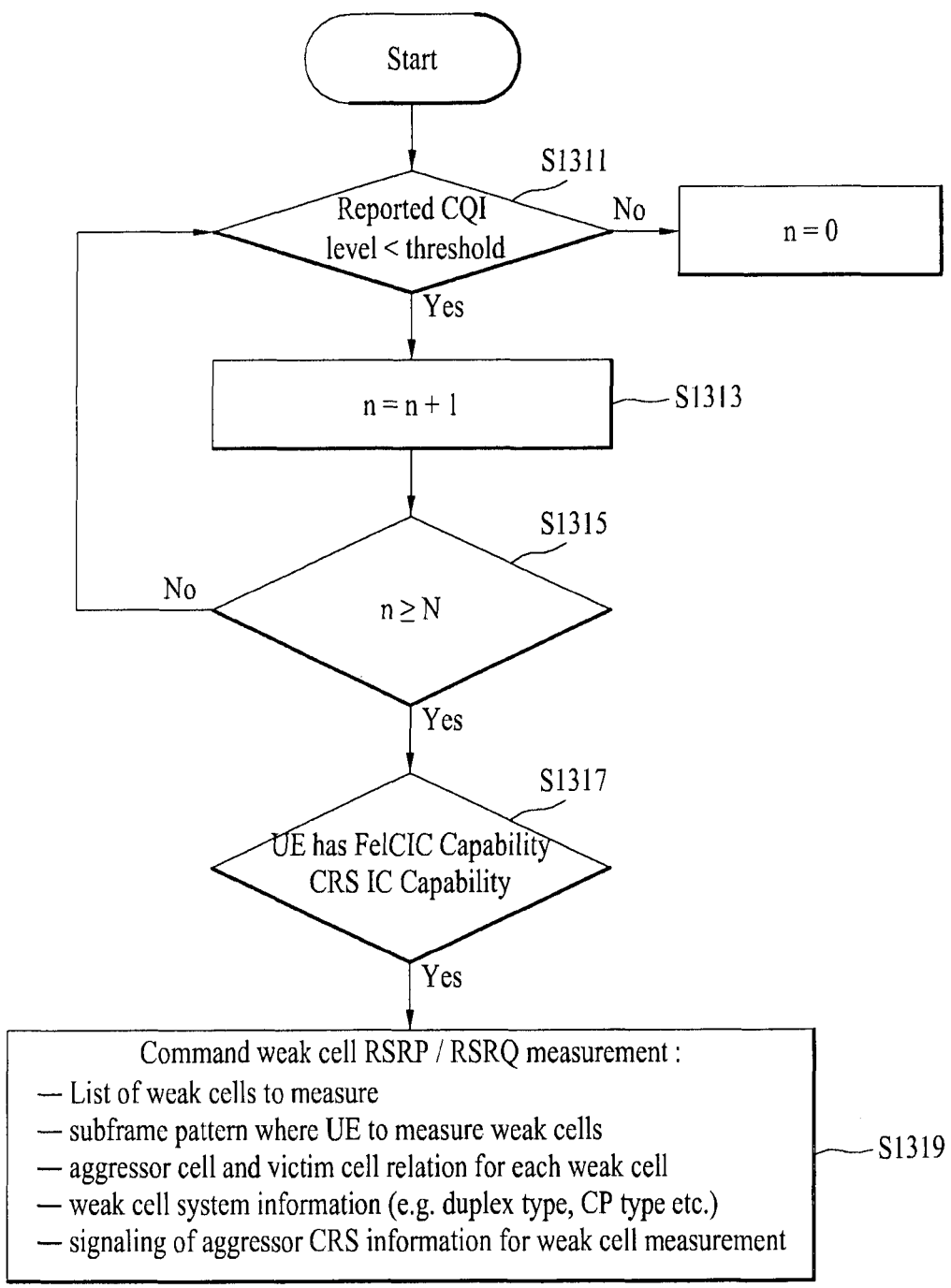

Therefore, the eNB may command the corresponding UE to measure a weak cell to perform handover to a neighbor pico eNB, and may transmit necessary signaling information and CRS information of a neighbor cell. FIG. 13 is a flowchart of a process from among processes in which the eNB can recognize that the corresponding UE is located in the CRE region under the condition that a CQI level reported by the UE is continuously equal to or less than a predetermined CQI level. In S1311 to S1315, if a CQI level reported by the UE is equal to or less than a threshold value and reaches a predetermined value (N) or higher, the eNB determines the UE capability in step S1317. If the UE has FeICIC capability and CRS IC capability, the UE may transmit a weak cell measurement command in step S1317. Detailed description of information that is capable of being contained in the weak cell measurement command or being simultaneously transmitted is based on step S1117 of FIG. 11.

The above-mentioned measurement command will hereinafter be described in detail.

If the FeICIC capability is set in the UE-EUTRA-Capability information element (if the corresponding UE can perform FeICIC), the eNB may command the corresponding UE to measure a reference signal of each neighbor pico eNB having low intensity of a reception signal of the corresponding UE. In the network in which ABS is configured, the eNB may command the UE to perform restricted measurement. In this case, in order to perform the restricted measurement in view of a subframe, different subframe sets for serving cell CQI reporting are configured, and the list of cell IDs and the measurement subframe pattern for the cell ID list may be designated for restricted RRM/RLM measurement of a neighbor cell.

For example, the eNB may indicate restricted RRM/RLM measurement through MeasObjectEUTRA information element (IE) including subfields shown in the following Table 3.

TABLE 3

```
MeasSubframePatternConfigNeigh ::=    CHOICE {
    release                                       NULL,
    setup                                         SEQUENCE {
        measSubframePatternNeigh              MeasSubframePattern-r10,
        measSubframeCellList                  MeasSubframeCellList-r10
    OPTIONAL    -- Cond measSubframe
        aggressorCellCRSinformation {
            Cell ID, Number of CRS ports, CRS transmission BW, center frequency, subframes
containing CRS in the data region }
        }
}
```

In Table 3, 'measSubframePatternNeig' may denote a subframe pattern that must perform neighbor cell RSRP/RSRQ measurement, and 'measSubframeCellList-r10' may denote the list of cells to which 'measSubframePatternNeigh' is applied. That is, the eNB may allocate a subframe pattern to be used for RSRP/RSRQ measurement of a specific cell list to the UE through a sub-element shown in Table 3. Preferably, the subframe pattern must be designated as a subframe pattern, that is set to ABS by the macro eNBs, to increase RSRP/RSRQ performance of the pico eNB. The cell contained in 'measSubframeCellList' information may be a weak cell under high interference, and 'aggressorCell-CRSinformation' information may be RS information causing high interference to a cell contained in the measSubframeCellList information.

Configuration of restricted measurement for neighbor cell RRM measurement may indicate that 'MeassubframePatternNeigh' information for a neighbor cell RRM has been configured. In this case, assuming that additional aggressor cell CRS information is not present, the UE performs RRM only in a subframe designated in the 'MeassubframePattern-Neigh' information of cells contained in the 'meassubframe-CellList' information. However, upon receiving the additional aggressor cell list and CRS information (aggressorCellCRSinformation) of the corresponding cells, the UE performs RRM only in a subframe designated in 'MeassubframePatternNeigh' information in association with the cells contained in the meassubframeCellList information, and then reports a value (e.g., measured RSRQ/RSRP) obtained after CRS interference of aggressor cells is reduced to a serving cell of the UE.

In more detail, the RRM operations are as follows. If the restricted measurement for RRM is configured and CRS information of aggressor cells is received, and if the CRS transmission position of a target cell which will attempt to perform RRM in a non-MBSFN subframe overlaps and collides with a CRS transmission position of a specific cell contained in 'aggressorCellCRSinformation' (i.e., Colliding CRS case), CRS of the specific cell is cancelled to measure RSRP of the target cell to be measured, and the RSRP value is then calculated and reported. That is, the CRS quality obtained after interference of the colliding CRS is reduced is defined as RSRP and the defined RSRP is then reported.

However, for RSSI measurement, CRS IC of the aggressor cells is not always requested for RSSI measurement. In other words, CRS IC of the aggressor cells may be omitted as necessary. If the restricted measurement is configured, RSSI has been defined to perform electric field strength measurement and averaging within all symbols of a specific subframe in which RRM measurement is needed, such that CRS IC need not be performed. Therefore, in the case of calculating RSRQ (where RSRQ=N*RSRP/RSSI), CRS cancellation of a specific cell is performed in a numerator of RSRQ such that CRS influence of the aggressor cell is excluded. In the case of calculating RSSI, influence of CRS of aggressor cells remains unchanged.

The above-mentioned RSRP and RSRQ measurement can be applied to the case in which RRM of the corresponding target cell is performed under the condition that restricted measurement is established for RRM of a specific target cell and CRS information of aggressor cells of the corresponding target cell is signaled.

In addition, 'aggressorCellCRSinformation' may include serving cell information. That is, a serving cell of a specific neighbor cell may be used as an aggressor. In this case, when the UE performs weak cell RRM, the UE must report the value obtained after CRS IC of the serving cell is executed to the serving cell. However, if the UE has already received serving cell information as another container, the UE need not perform additional signaling of the serving cell CRS information, such that it can report a value obtained after CRS IC of the serving cell requiring restricted RRM measurement is performed, through a serving cell ID or simple signaling information.

For example, if the remaining information other than a cell ID is missed (lost) in 'aggressorCellCRSinformation' and the corresponding cell ID is identical to the serving cell ID, the UE may reduce interference of the serving cell CRS for neighbor cell RRM on the basis of the serving cell information already known to the UE. In addition, if information of a cell ID corresponding to the serving cell ID in the 'aggressorCellCRSinformation' information is different from serving cell information received through another higher layer signaling (e.g., dedicated RRC configuration or common RRC configuration), the information received through another higher layer signaling may have priority.

In another example, if restricted measurement for neighbor cell RRM is configured, the operation for reporting RSRP/RSRQ values obtained after execution of IC of the serving cell CRS may be established as a default. This reporting operation is requisite for the case in which a CRS of a specific neighbor cell requiring RRM measurement overlaps and collides with a CRS of the serving cell in time/frequency domains. Specifically, for RSRP, the value obtained after execution of IC of the serving cell CRS must be reported/calculated.

If restricted measurement for the neighbor cell RRM is not configured, 'aggressorCellCRS information' information (i.e., 'MeassubframePatternNeigh' information) may not be signaled to a UE. In other words, 'aggressorCell-CRSinformation' information can be signaled only when 'MeassubframePatternNeigh' information is configured.

In order to deliver 'aggressorCellCRSinformation' information when the serving cell commands the UE to perform neighbor cell RRM, it is necessary for a plurality of eNBs to first exchange information of the aggressor cell or information the victim cell with one another. For this operation, the eNB acting as each victim cell can transmit the list of its own aggressor cells to neighbor eNBs through a communication interface between eNBs. When the eNBs having received the aggressor cell list commands the UE to measure each weak cell, the eNBs perform signaling of the aggressor cell list of the corresponding weak cells to the UE, such that the UE can report an RSRQ value obtained after reduction of CRS interference of cells acting as aggressors, i.e., an RSRQ value obtained after cancellation of CRS of aggressor cells. In another scheme, individual eNBs may exchange the list of victim cells, each of which receives serious interference from the eNBs, through an X2 interface, such that the eNBs may share information indicating whether which cell is operated as an aggressor of each victim cell.

Acquisition of System Information of Neighbor Cell under High Interference

The eNB may enable the UE to be handed over to a specific pico eNB. For handover to the pico eNB, the macro eNB may further transmit a variety of information to the UE. For example, system information of the corresponding pico eNB, master information block (MIB) information of the LTE system, SFN of the corresponding cell, and an SFN difference between the macro eNB and the current serving macro eNB can be additionally transmitted from the macro eNB to the UE. (Since SFN may be different from SFN obtained through a PBCH of a pico cell, the UE may transmit not only SFN subframe offset/radio frame offset but also OFDM symbol offset/sample offset information between two cells so as to indicate a correct timing offset between two cells) It may be impossible to decode a PBCH of the pico eNB due to interference caused by a PBCH of the macro eNB, and the macro eNB previously transmits system information of a target cell, MIB and SFN/SFN offset transmitted through a PBCH to the UE either in case of handover or prior to execution of such handover, such that the corresponding UE can be handed over to the pico eNB without decoding a PBCH of the pico eNB.

Meanwhile, assuming that a UE to be handed over to a specific pico eNB by the macro eNB has PBCH IC capability, the macro eNB need not pre-deliver at least information transmitted through a PBCH from among system information of the pico eNB to the UE. If the UE has PBCH IC capability, the UE can be handed over to the pico eNB such that it can directly decode a PBCH of the pico eNB.

That is, a method for acquiring system information of a target cell by a UE performing handover may be determined according to UE CRE related capability (specifically, PBCH IC capability).

However, in this case, the ratio of PBCH power to CRS power of the corresponding pico eNB (i.e., the ratio of CRS transmission power to PBCH transmission power of the corresponding pico BS) and the ratio of PBCH power of a neighbor cell to PBCH power of a serving cell must be recognized by the UE. The above-mentioned PBCH to CRS power ratio may be contained in a handover command and then transmitted. However, the scope or spirit of the present invention is not limited thereto, and the PBCH to CRS power ratio may be signaled separately.

In accordance with another embodiment, instead of using signaling of the PSS/SSS/PBCH-to-CRS power ratio of its own cell and a neighbor cell, the UE may assume the PSS/SSS-to-PBCH transmission power ratios of its own cell and a neighbor cell in a manner that the UE can recognize the degree of interference of the neighbor cell. For example, the UE must assume that corresponding channels are transmitted with either the same transmission power or a difference of a predetermined level (delta power) compared with CRS, and such information may be promised as a higher layer signal. Signaling of more detailed power ratio will be described later.

Meanwhile, after the UE is successfully handed over to the pico eNB, if MIB contained in a PBCH of the pico eNB is changed and there is no PBCH IC capability, it is very difficult for the UE to recognize the changed MIB. Assuming that the UE does not recognize the changed MIB, the corresponding UE may experience continuous errors in transmission/reception of data and control information. For example, although PHICH configuration contained in MIB is changed, the UE fails in successful reception of PBCH. Thus, if the UE does not recognize the changed MIB, the corresponding UE may experience continuous errors. In this case, the UE must carry out a specific procedure for querying the pico eNB whether MIB was changed. Therefore, the UE transmits an error report to the pico eNB, such that this information may be used as an indicator for indicating the problems generated when the corresponding UE receives services. The error report may be used as a signal indicating that a problem unknown to the UE is associated with the UE itself. As a result, the error report may be used as a signal for querying the eNB whether system information is changed. Upon receiving the error report, the eNB transmits the changed system information to the UE only when system information is changed. If system information is not changed, the eNB may indicate no change of system information or may also indicate no change of system information using an acknowledgement (ACK) message. A valid time is present per system information. In this case, the UE may request specific information indicting whether system information has been changed for a specific time duration from the eNB. In this case, information regarding the specific time duration must be transmitted to the eNB.

In another example related to change of system information, a UE may separately request each system information from the eNB. In case of a UE located in the CRE region (i.e., a UE which uses a pico eNB as a serving cell and is located at a specific position having high CRE bias of the pico eNB), the UE may have difficulty in correctly receiving system information of the pico eNB. However, if the UE is located within a predetermined range from a pico cell, namely, if the UE is located close to the pico eNB, the UE may receive some system information. The UE may request specific system information from the eNB. If the UE transmits the MIB request to the eNB, the eNB must transmit the MIB to the corresponding UE over a PDSCH. In this case, MIB is CRC-masked with UE's C-RNTI but not SI-RNTI, such that the CRC-masked result is sent to the corresponding UE through dedicated transmission.

In addition, a transmission start time of the paging and SIB 1 (System Information Block 1) information to be transmitted by the macro eNB may be identical to that of the pico eNB in so far as coordination of separate subframe number arrangement between the macro eNB and the pico eNB is not performed through a channel assigned a decided subframe number. In this case, paging and SIB 1 transmitted from the pico eNB may receive serious interference in the same manner as in a PBCH. Therefore, the UE may transmit the paging and SIB 1 request to the eNB. The above-mentioned system information request may not be limited to MIB, paging, and SIB 1.

In another embodiment, the UE may request only information changed within a specific time interval (i.e., only newly updated system information) from the eNB. Likewise, the eNB having received the above information transmits only updated system information, performs CRC masking with a C-RNIT of a UE requesting system information, and transmits the CRC masking result to the corresponding UE over a PDSCH. If an aggregate of UEs requesting such information is present, the eNB may perform multicasting of a group of specific UEs.

From among the above-mentioned information, if the macro eNB (source eNB) before handover transmits system information of the pico eNB (target eNB) to the UE, the UE may assume that two cells maintain synchronization within a predetermined range (e.g., within the CP length, or within a specific time (within 3 μs)). Alternatively, the UE may explicitly indicate that two cells maintain synchronization within a predetermined range. In this case, the UE may perform synchronization and time/frequency tracking through CRS of a pico cell or another cell maintaining synchronization with the corresponding pico cell. However, if a timing jitter or low time accuracy are decided, the timing jitter must be tracked on the basis of a CRS of the pico cell.

If timing points of two cells always collide with each other, i.e., if PSS/SSS and/or CRS of the two cells are always transmitted in the same time-frequency resource region, the BS informs the UE that PSS/SSS and/or CRS always maintain synchronization. Specifically, the above-mentioned case is more important in the case in which the UE has to perform tracking using a CRS of the macro eNB.

Although assumption of synchronization and synchronization signaling related to only two cells have been disclosed for convenience of description and better understanding of the present invention, it should be noted that the above-mentioned assumption and signaling can also be equally or similarly applied to a plurality of cells as necessary.

Execution of Measurement of Serving Cell under High Interference

If FeICIC capability is set in UE-EUTRA-Capability information element (if the corresponding UE is configured to perform FeICIC), and if CRS IC capability is set, the serving cell can inform the UE of not only the list of aggressor causing serious interference to the serving cell cells, but also CRS information of each cell. However, information as to whether the UE will perform CRS IC on certain measurement (i.e., information as to whether CRE-related capability of a UE was used) may be determined in different ways according to a measurement target, the presence or absence of UE capability, restricted measurement configuration, etc. Hereinafter, the case (i) for RRM measurement, the case (ii) for RLM measurement, and the case (iii) for restricted measurement will be sequentially described.

In case of RRM measurement, in the legacy LTE/LTEOA system, RRM/RLM of the serving cell is performed only in a given subframe (MeassubframePattern) when 'MeassubframePatternPCell(-r10)' is received in 'RadioResourceconfigDedicated IE'. If restricted measurement for the serving cell RRM/RLM is configured as described above, and if the UE FeICIC capability is set, the serving cell informs the UE of CRS information of each cell operated as an aggressor, resulting in increased RRM/RLM performance. The UE having received the above CRS information performs CRS IC of these cells, and then performs RRM/RLM. In this case, detailed information of the above CRS information may refer to the signaling part of RS information to be described later.

Meanwhile, although the UE receives CRS information of aggressor cells from the eNB, if restricted measurement for RRM/RLM is not configured, i.e., if the UE does not receive a separate measurement pattern for RRM/RLM, the UE does not perform any other IC operations related to CRS interference of a neighbor cell when performing RRM/RLM of the serving cell.

A more detailed description of the RRM operation is as follows. Assuming that restricted measurement for RRM is configured and CRS information of aggressor cells is received, if the CRS transmission position of a target cell that attempts to perform RRM in a non-MBSFN subframe overlaps and collies with (i.e., Colliding CRS case) the CRS transmission position of a specific cell contained in 'aggressorCellCRSinformation', CRS of the specific cell is cancelled to measure RSRP of the target cell to be measured, and the RSRP value is then calculated and reported. That is, the CRS quality obtained after interference of the colliding CRS is reduced is defined as RSRP and the defined RSRP is then reported.

However, for RSSI measurement, CRS IC of the aggressor cells is not always requested for RSSI measurement. In other words, CRS IC of the aggressor cells may be omitted as necessary. If the restricted measurement is configured, RSSI has been defined to perform electric field strength measurement and averaging within all symbols of a specific subframe in which RRM measurement is needed, such that CRS IC need not be performed. Therefore, in the case of calculating RSRQ (where RSRQ=N*RSRP/RSSI), CRS cancellation of a specific cell is performed in a numerator of RSRQ such that CRS influence of the aggressor cell is excluded. In the case of calculating RSSI, influence of CRS of aggressor cells remains unchanged.

If a specific UE has interference cancellation capability, RLM of the corresponding UE must be carried out on the basis of SINR obtained after completion of cancellation of CRS interference. Although interference is higher than a predetermined interference level, data and control information received by the corresponding UE can be stably demodulated and decoded because the corresponding UE performs cancellation of interference.

Specifically, if the CRS of several cells collide with each other because CRS positions are transmitted from the same REs as those of the neighbor cells, the UE first performs cancellation of a neighbor cell CRS used as dominant interference. Thereafter, the UE determines how much SINR of a CRS received from its own serving cell is good, such that it may determine whether to continuously maintain synchronization with the corresponding cell, or may decide to declare Radio Link Failure (RLF). However, CRS SINR obtained after all CRS of neighbor cells are cancelled are unable to reflect realistic SINR in an RE other than CRS. Interference may be removed from the RE mapped to CRS, such that SINR of the RE can be improved. However, in fact, interference from neighbor cells may still remain in an RE mapped to a PDCCH, such that it is impossible for the CRS SINR to reflect realistic SINR in the RE. thereafter, after completion of CRS interference cancellation, the degree of neighbor-cell interference applied to the RE mapped to a PDCCH needs to be recognized by the UE, such that the UE can recognize a substantial interference level and can perform more accurate RLM.

In conclusion, for reliable RLM, the PDCCH-to-CRS power ratio of a neighbor cell must be signaled to the UE. The UE cancels CRS using such information, and then performs RLM by referring to the resultant value. That is, when measuring/calculating CRS SINR for RLM, the remaining information amount obtained after completion CRS interference cancellation of a neighbor cell is calculated in consideration of the PDCCH-to-CRS power ratio of a neighbor or contiguous cell.

The PDCCH-to-CRS power ratio of the neighbor cell can be transmitted as a higher layer signal. Specifically, if the eNB transmission power is divided into a plurality of subframe sets having different transmission powers in the same manner as in ABS, the PDCCH-to-CRS power ratio of the eNB per set must be signaled.

If restricted measurement for CSI measurement is configured, i.e., if a subframe pattern for CSI reporting is configured, the UE measures a CSI per subframe pattern and reports the measured CSI. In the following description, it is assumed that 'csi-MeassubframeSet1' related to restricted measurement is a subframe set obtained when neighbor macro eNBs reduce interference through ABS operations or the like, and 'csi-MeassubframeSet2' is a subframe set obtained when interference from neighbor macro eNBS is not reduced. Restricted CSI measurement is configured in the UE, and the serving cell can inform the UE of CRS information of neighbor aggressor cells. The UE having received the above information performs CRS IC of neighbor aggressor eNBs in the subframe set (csi-MeassubframeSet1) corresponding to a subframe in which the neighbor aggressor eNBs can reduce interference using ABS operations or the like, such that the UE may report more improved CSI. However, although the UE has CRS IC capability in the other subframe set (csi-MeassubframeSet2) used as a normal subframe in which the operation for reducing transmission power of neighbor aggressor cells is not performed, CRS IC is not performed in the corresponding subframe set. In more detail, although CRS interference is cancelled, interference generated in data REs other than CRS is not reduced, so that the UE does not perform the CRS IC in the corresponding subframe set.

Although CRS information of neighbor aggressor cells is received, if 'csi-subframePattern' information is not configured in the UE, i.e., if the UE does not receive a plurality of CSI measurement subframe patterns (e.g., csi-MeassubframeSet1 and csi-MeassubframeSet2), the UE may not perform CRS IC for CSI measurement.

Alternatively, although 'csi-subframePattern' information is configured in the UE, i.e., although the UE receives a plurality of CSI measurement subframe patterns (e.g., csi-MeassubframeSet1 and csi-MeassubframeSet2) and does not receive CRS information of each neighbor aggressor cell, the UE may not perform the CRS IC operation for CSI measurement even at a certain CSI measurement subframe set. Provided that the UE performs the CRS IC operation at a specific subframe set for CSI measurement, the UE informs the eNB of CRS IC execution when calculating the CSI value, and can inform the eNB of information indicating which one of subframe sets has been used to carry out the above operation.

In order to configure, by the UE, 'csi-subframePatternconfig' information and to receive the CSI report after execution of CRS IC at a specific subframe set by providing CRS information of the aggressor cells, the eNB may inform the UE of information indicating which subframe sets is a subframe set that must be CRS-IC-processed by the UE. Alternatively, the above-mentioned information may be promised in the order of subframes signaled between the eNB and the UE. For example, if CRS information is given in 'csi-MeassubframeSet1', the csi-MeassubframeSet1 may be promised to be a subframe set, CRS IC of which is needed. In case of csi-MeassubframeSet2, the csi-MeassubframeSet2 may be promised to be a subframe set, CRS IC of which is no longer required.

Figure 14:
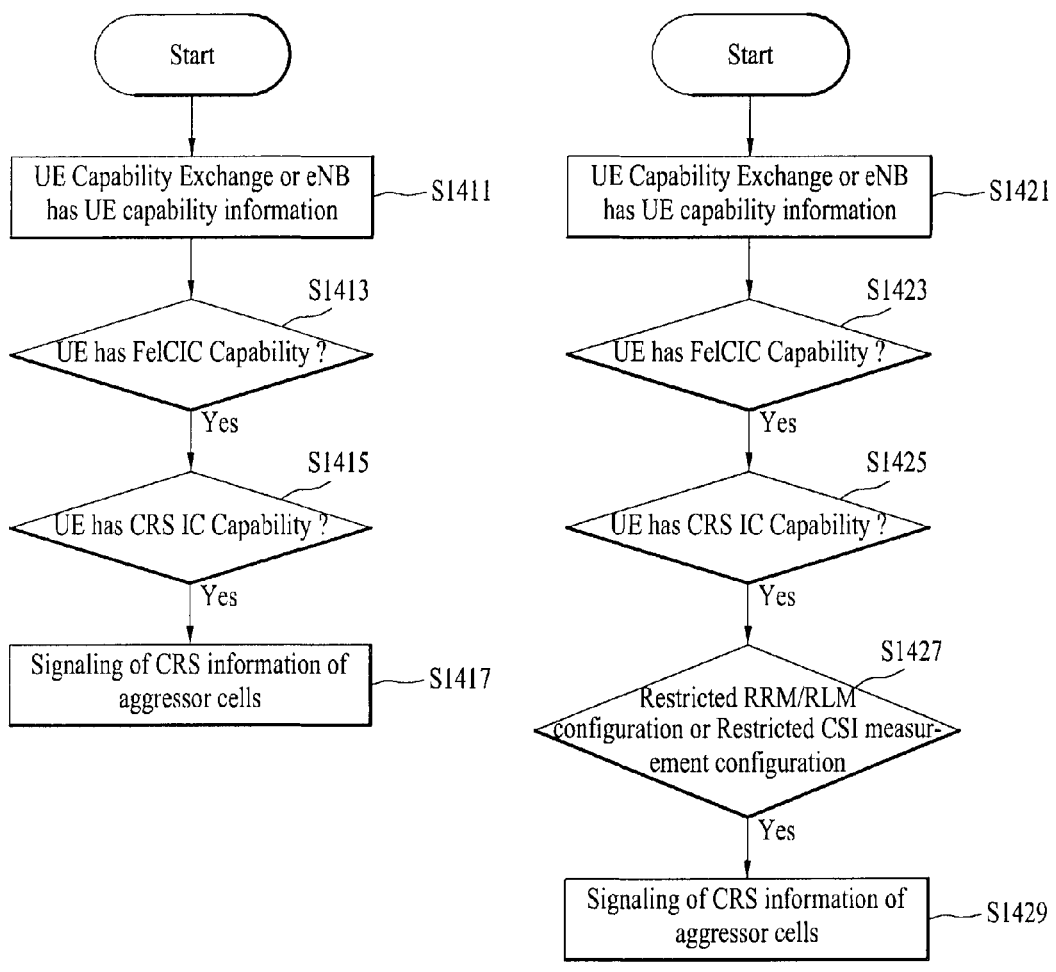
FIG. 14 is a flowchart illustrating a method for measuring a serving cell according to embodiments of the present invention.

FIG. 14 is a flowchart illustrating measurement of the serving cell. Referring to FIG. 14(a), if the eNB acting as the serving cell recognizes UE capability information (CRE related capability information), the eNB confirms the UE capability information. If there is no UE capability information, a procedure for exchanging the UE capability information may be performed. If the UE has FeICIC capability in step S1413, it is determined whether the UE has CRS IC capability in step S1415. If the UE has CRS IC capability, RS information of aggressor cells may be transferred to the UE. FIG. 14(b) is basically similar to FIG. 14(a). However, if restricted RRM/RLM configuration or restricted CSI measurement configuration is further considered and satisfied in step S1427, RS information of the aggressor cells may be signaled.

Signaling of Power Ratio

If the UE has a interference cancellation receiver, the eNB may inform the UE of the PSS-to-CRS power ratio of its own cell and neighbor cell, the SSS-to-CRS power ratio, and the PBCH-to-CRS power ratio, the UE may remove interference such as PSS/SSS/PBCH of the cell causing such interference, such that handover to a weak cell can be smoothly carried out. In this case, estimation of channels (such as PSS/SSS and PBCH) is achieved on the basis of CRS, the PSS/SSS to CRS power ratio and the PBCH to CRS power ratio must be signaled to the UE. Specifically, if a dominant interference source of the target cell for handover is a cell currently attached to the UE, the eNB can transmit the PSS/SSS/PBCH to CRS power ratio of its own cell.

In accordance with another embodiment, instead of using signaling of the PSS/SSS/PBCH-to-CRS power ratio of its own cell and a neighbor cell, the UE may assume the PSS/SSS-to-PBCH transmission power ratios of its own cell and a neighbor cell in a manner that the UE can recognize the degree of interference of the neighbor cell. For example, the UE must assume that corresponding channels are transmitted with either the same transmission power or a difference of a predetermined level (delta power) compared with CRS, and such information may be promised as a higher layer signal. Preferably, in order to perform not only performance improvement of a channel reception signal from the UE serving cell but also interference cancellation of the reception signal, the BS may perform signaling of per-channel CRS power ratios of its own cell and a neighbor cell as necessary.

As an example for reliably receiving/demodulating PSS/SSS/PBCH in a serious interference environment, the UE may detect a cell only in a subframe established as ABS by macro eNBs. That is, when ABS patterns are exchanged between the macro eNB and the pico eNB, subframe offset information between individual eNBs is also exchanged, such that a subframe for PSS/SSS/PBCH transmission of the macro eNB may not collide with a subframe for PSS/SSS/PBCH of the pico eNB. In addition, the macro eNBs exchange the ABS patterns with one another in consideration of the above information, and each macro eNB may certainly set the subframe requisite for the pico eNB configured to transmit PSS/SSS/PBCH to the ABS as necessary. The UE may attempt to detect PSS/SSS/PBCH only in a subframe established as ABS by the macro eNBs.

Signaling of RS (Reference Signal) Information

For CRS interference handling of a UE, RS information signaled by the eNB may include a cell ID of a neighbor cell, the number of CRS ports, and time/frequency information requisite for CRS transmission. Time-related information may be denoted by a subframe in which CRS is transmitted, and its associated signaling may be MBSFN subframe setting. Frequency-related information requires a center frequency and bandwidth of each neighbor cell, the number of PRBs for CRS transmission, and the PRB position information. A message 'NeighborCellCRSInformation' requisite for transmission of such information may be defined as the following table 4.

TABLE 4

NeighborCellCRSInformation ::= CHOICE {
   Cell ID
       { number of CRS ports,
       frequency information of CRS transmission,
       time information of CRS transmission }
}

Multiple cell IDs may be transmitted in NeighborCellCRSInformation', the number of CRS ports per cell ID, transmission of frequency CRS information, and time information of CRS transmission may be transmitted. Whereas the number of CRS ports per specific cell ID must be transmitted, frequency CRS information transmission and CRS transmission time information may be transmitted as necessary. In this case, the frequency CRS information transmission may be frequency information related to CRS transmission, and may be denoted by a center frequency and bandwidth of a specific cell, or the number of PRBs for CRS transmission and the PRB position information. The term 'time information' for CRS transmission may be time information related to CRS transmission, and may be denoted by a subframe in which CRS is transmitted. For example, the time information may be set to MBSFN subframe configuration.

Figure 15:
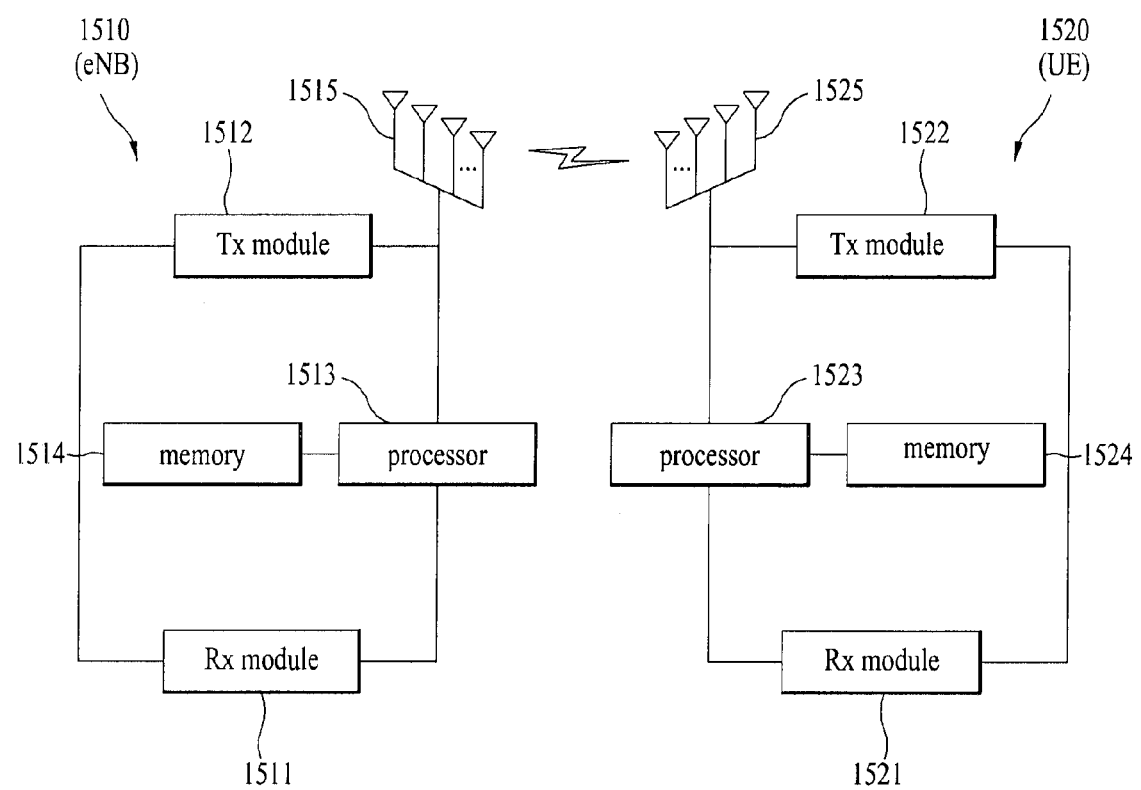
FIG. 15 is a block diagram illustrating a transceiver apparatus applicable to embodiments of the present invention.

FIG. 15 is a block diagram illustrating a transmission point apparatus and a UE apparatus according to embodiments of the present invention.

Referring to FIG. 15, the transmission point apparatus 1510 according to the present invention may include a reception (Rx) module 1511, a transmission (Tx) module 1512, a processor 1513, a memory 1514, and a plurality of antennas 1515. The plurality of antennas 1515 indicates a transmission point apparatus for supporting MIMO transmission and reception. The reception (Rx) module 1511 may receive a variety of signals, data and information on an uplink starting from the UE. The Tx module 1512 may transmit a variety of signals, data and information on a downlink for the UE. The processor 1513 may provide overall control to the transmission point apparatus 1510.

The processor 1513 of the transmission point apparatus 1510 according to one embodiment of the present invention can process the above-mentioned embodiments.

The processor 1513 of the transmission point apparatus 1510 processes information received at the transmission point apparatus 1510 and transmission information to be transmitted externally. The memory 1514 may store the processed information for a predetermined time. The memory 1514 may be replaced with a component such as a buffer (not shown).

Referring to FIG. 15, the UE apparatus 1520 may include an Rx module 1521, a Tx module 1522, a processor 1523, a memory 1524, and a plurality of antennas 1525. The plurality of antennas 1525 indicates a UE apparatus for supporting MIMO transmission and reception. The Rx module 1521 may receive downlink signals, data and information from the BS (eNB). The Tx module 1522 may transmit uplink signals, data and information to the BS (eNB). The processor 1523 may provide overall control to the UE apparatus 1520.

The processor 1523 of the UE apparatus 1520 according to one embodiment of the present invention can process the above-mentioned embodiments.

The processor 1523 of the UE apparatus 1520 processes information received at the UE apparatus 1520 and transmission information to be transmitted externally. The memory 1524 may store the processed information for a predetermined time. The memory 1524 may be replaced with a component such as a buffer (not shown).

The specific configurations of the transmission point apparatus and the UE apparatus may be implemented such that the various embodiments of the present invention are performed independently or two or more embodiments of the present invention are performed simultaneously. Redundant matters will not be described herein for clarity.

The description of the transmission point apparatus 1510 shown in FIG. 15 may be applied to the eNB (BS), or may also be applied to a relay node (RN) acting as a DL transmission entity or UL reception entity without departing from the scope or spirit of the present invention. In addition, the description of the UE apparatus 1520 may be applied to the UE, or may also be applied to a relay node (RN) acting as a UL transmission entity or DL reception entity without departing from the scope or spirit of the present invention.

The above-described embodiments of the present invention can be implemented by a variety of means, for example, hardware, firmware, software, or a combination thereof.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory to be driven by a processor. The memory is located inside or outside of the processor, so that it can communicate with the aforementioned processor via a variety of well-known parts.

The detailed description of the exemplary embodiments of the present invention has been given to enable those skilled in the art to implement and practice the invention.

Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

MODE FOR INVENTION

Various embodiments have been described in the best mode for carrying out the invention.

INDUSTRIAL APPLICABILITY

The embodiments of the present invention can be applied to a variety of mobile communication systems.

The invention claimed is:

1. A method for performing radio link monitoring by a user equipment (UE) in a wireless communication system, the method comprising:
   receiving predetermined power ratio information of a neighbor cell from a serving cell, wherein the predetermined power ratio information includes a ratio of a transmission power of a physical downlink control channel (PDCCH) of the neighbor cell to a transmission power of a cell-specific reference signal (CRS) of the neighbor cell;
   measuring a CRS of the serving cell;
   performing cancellation of the CRS of the neighbor cell from the CRS of the serving cell;
   calculating a signal-to-interference plus noise ratio (SINR) of the serving cell using the predetermined power ratio information and the CRS of the serving cell; and
   determining whether to declare a radio link failure (RLF) for the serving cell based on the SINR of the serving cell.

2. The method according to claim 1, wherein the predetermined power ratio information is transmitted to the UE through higher layer signaling.

3. The method according to claim 1, wherein the neighbor cell is a cell used as an interference source when the UE receives the CRS of the serving cell.

4. A method for receiving system information by a user equipment (UE) in a wireless communication system, the method comprising:

receiving predetermined power ratio information of a neighbor cell from a serving cell, wherein the predetermined power ratio information includes a ratio of a transmission power of a physical downlink control channel (PDCCH) of the neighbor cell to a transmission power of a cell-specific reference signal (CRS) of the neighbor cell;

performing cancellation of a physical broadcast channel (PBCH) signal of the neighbor cell;

performing a channel estimation of the serving cell based on the cancellation and the predetermined power ratio information; and receiving system information through a PBCH of the serving cell based on the channel estimation.

5. The method according to claim 4, wherein the serving cell and the neighbor cell are identical in terms of at least one of a radio frame and a subframe boundary.

6. The method according to claim 4, wherein the predetermined power ratio information is transmitted to the UE through higher layer signaling.

7. The method according to claim 4, wherein the neighbor cell is a cell used as an interference source when the UE receives a CRS of the serving cell.

8. A user equipment (UE) apparatus for use in a wireless communication system, the UE apparatus comprising:
a receiver; and
a processor configured to:
control the receiver to receive a predetermined power ratio information of a neighbor cell from a serving cell, wherein the predetermined power ratio information includes a ratio of a transmission power of a physical downlink control channel (PDCCH) of the neighbor cell to a transmission power of a cell-specific reference signal (CRS) of the neighbor cell,
measure a CRS of the serving cell,
perform cancellation of the CRS of the neighbor cell from the CRS of the serving cell,
calculate a signal-to-interference plus noise ratio (SINR) of the serving cell using the predetermined power ratio information and the CRS of the serving cell, and
determine whether to declare a radio link failure (RLF) for the serving cell of the UE based on based on the SINR of the serving cell.

9. A user equipment (UE) apparatus for use in a wireless communication system, the UE apparatus comprising:
a receiver; and
a processor configured to:
control the receiver to receive a predetermined power ratio information of a neighbor cell from a serving cell, wherein the predetermined power ratio information includes a ratio of a transmission power of a cell-specific reference signal (CRS) of the neighbor cell;
perform cancellation of a physical broadcast channel (PBCH) signal of the neighbor cell,
perform a channel estimation of the serving cell based on the cancellation and the predetermined power ratio information, and
receive system information through a PBCH of the serving cell based on the channel estimation.

* * * * *